(12) United States Patent
Park et al.

(10) Patent No.: US 7,953,551 B2
(45) Date of Patent: May 31, 2011

(54) METHOD AND APPARATUS FOR MOVING IN MINIMUM COST PATH USING GRID MAP

(75) Inventors: Jun-ho Park, Hwaseong-si (KR); Hyoung-ki Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 158 days.

(21) Appl. No.: 11/319,054

(22) Filed: Dec. 28, 2005

(65) Prior Publication Data

US 2006/0149465 A1 Jul. 6, 2006

(30) Foreign Application Priority Data

Dec. 30, 2004 (KR) .................. 10-2004-0116864

(51) Int. Cl.
*G01C 21/30* (2006.01)
*G01C 21/32* (2006.01)

(52) U.S. Cl. ............ 701/209; 701/23; 701/26; 701/201; 701/202; 701/210

(58) Field of Classification Search .............. 701/209, 701/23, 26, 201, 202, 210; 901/50; 318/568.12; 706/19; 180/168

See application file for complete search history.

(56) References Cited

U.S. PATENT DOCUMENTS

| | | | | |
|---|---|---|---|---|
| 6,167,332 A * | 12/2000 | Kurtzberg et al. | ............. | 701/23 |
| 6,259,988 B1 * | 7/2001 | Galkowski et al. | ............ | 701/202 |
| 6,266,610 B1 * | 7/2001 | Schultz et al. | ................ | 701/201 |
| 6,477,515 B1 * | 11/2002 | Boroujerdi et al. | ............. | 706/14 |
| 7,251,548 B2 * | 7/2007 | Herz et al. | ........................ | 701/23 |
| 7,440,447 B2 * | 10/2008 | Kareev et al. | .................. | 370/359 |
| 7,706,921 B2 * | 4/2010 | Jung | .............................. | 700/258 |
| 2006/0083427 A1 * | 4/2006 | Jung et al. | ...................... | 382/201 |

FOREIGN PATENT DOCUMENTS

| | | |
|---|---|---|
| JP | 2003-29833 | 1/2003 |
| KR | 10-2004-0062041 | 7/2004 |

OTHER PUBLICATIONS

Anthony Stentz, "Optimal and Efficient Path Planning for Partially-Known Environment," In Proceedings, IEEE International Conference on Robotics and Automation, 1994, 5.*

Korean Office Action for corresponding Korean Patent Application No. 10-2004-0116864 dated Apr. 28, 2006 (4 pgs).

* cited by examiner

*Primary Examiner* — Khoi Tran
*Assistant Examiner* — Jorge O Peche
(74) *Attorney, Agent, or Firm* — Staas & Halsey LLP

(57) ABSTRACT

A method of moving in a minimum cost path using a grid map, and an apparatus to perform the method, the method including calculating a move cost to a goal, from each of a plurality of cells comprises in a space in which a mobile home appliance moves, and planning a movement path to the goal according to the move cost; determining one or more via points at which a direction changes on the movement path; planning the minimum cost path from the movement path by selecting one or more shortest-distance via points from the via points; and moving from a first shortest-distance via point to a second shortest-distance via point.

15 Claims, 15 Drawing Sheets

```
Void FindShortest(int V[ ], n){
    int cnt, subcnt;
        for (cnt = 0; cnt < (n-1); cnt++)
            for (subcnt = cnt+2; subcnt < n; subcnt++)
                if (PathExists(V[cnt], V[subcnt]))
                    {
                    EraseDummyViapoint(cnt, subcnt);
                    }
```

FIG. 14

| EXPERIMENT NUMBER | EXPERIMENTS ILLUSTRATED IN FIG. 12 | | EXPERIMENTS ILLUSTRATED IN FIG. 13 | |
|---|---|---|---|---|
| | D* algorithm | PRESENT INVENTION | D* algorithm | PRESENT INVENTION |
| 1 | 90.656 | 61.047 | 48.391 | 39.75 |
| 2 | 90.828 | 61.781 | 48.906 | 40.578 |
| 3 | 91.313 | 61.047 | 49.313 | 38.86 |
| 4 | 90.765 | 61.188 | 48.547 | 40.344 |
| 5 | 90.656 | 59.953 | 49.594 | 39.985 |
| 6 | 91.344 | 61.235 | 49.406 | 40.719 |
| 7 | 89.75 | 61.219 | 49.187 | 39.297 |
| 8 | 89.672 | 60.86 | 49.281 | 40.125 |
| 9 | 89.797 | 60.047 | 49.047 | 39.672 |
| 10 | 89.578 | 59.656 | 49.25 | 38.641 |
| 11 | 89.062 | 60 | 49.453 | 39.484 |
| 12 | 90.078 | 60.718 | 49 | 40.328 |
| 13 | 89.578 | 60.797 | 49.172 | 38.015 |
| 14 | 90 | 60.422 | 49.172 | 38.344 |
| 15 | 89.609 | 60.297 | 49.016 | 40.485 |
| 16 | 89.562 | 60.203 | 49.218 | 38.859 |
| 17 | 89.75 | 61.828 | 49.546 | 40.328 |
| 18 | 89.937 | 60.047 | 49.594 | 39.422 |
| 19 | 89.297 | 60.906 | 49.657 | 39.484 |
| 20 | 90.922 | 60.578 | 49.203 | 38.937 |
| 21 | 90.312 | 61.203 | 48.922 | 38.797 |
| 22 | 89.844 | 61.578 | 49.391 | 38.875 |
| 23 | 90.032 | 60.094 | 49.015 | 40.359 |
| 24 | 89.203 | 61.625 | 48.656 | 40.265 |
| 25 | 89.734 | 60.234 | 49.25 | 39.812 |
| 26 | 90.078 | 61.266 | 49.25 | 39.922 |
| 27 | 90.579 | 61.078 | 49.563 | 38.578 |
| 28 | 90.5 | 60 | 49.297 | 38.688 |
| 29 | 90.282 | 59.985 | 49.234 | 41.14 |
| 30 | 89.625 | 59.516 | 49.266 | 41.421 |
| Average | 90.0781 | 60.6802667 | 49.1932333 | 39.6504667 |

METHOD AND APPARATUS FOR MOVING IN MINIMUM COST PATH USING GRID MAP

CROSS-REFERENCE TO RELATED APPLICATIONS

This application claims the benefit of Korean Patent Application No.10-2004-116864,filed on Dec. 30, 2004, in the Korean Intellectual Property Office, the disclosure of which is incorporated herein by reference.

BACKGROUND OF THE INVENTION

1. Field of the Invention

The present invention relates to a method of moving in a minimum cost path using a grid map, and an apparatus to perform the method.

2. Description of the Related Art

Mobile home appliances must satisfy various conditions to move. They must be able to avoid obstacles, move in a manner to be suitable their functions, and reduce a movement distance.

Fixed obstacles, such as, for example, furniture and a bed, exist within indoor space where mobile home appliances typically move. When the positions of the furniture and the bed are input to a home appliance, the home appliance finds a shortest path avoiding the obstacles. However, new obstacles, such as a person, a chair, and/or other movable objects other than the obstacles that have been input to the home appliance, may be additionally brought to a movement space. For example, in a case in which only fixed furniture and a bed have been input as obstacles in a space, if someone brings a chair to the space, the chair becomes a new obstacle.

A conventional algorithm of planning a movement path using a grid map and executing movement has been proposed.

FIGS. 1A through 1C illustrate a conventional algorithm of planning an optimal path using a grid map. The algorithm is referred to as a D* algorithm [Anthony Stentz, "Optimal and Efficient Path Planning for Partially-Known Environment," In Proceedings, IEEE International Conference on Robotics and Automation, 1994, 5]. According to the algorithm, a movement path is set based on a cell, and movement is performed in units of cells. When a new obstacle other than fixed obstacles is encountered, the movement path is partially replanned.

FIG. 1A illustrates initial grid map information set in a case in which the positions of obstacles are input before moving. A grid map has information regarding an optimal direction to move from each of a plurality of cells defined by dividing a movement area by a predetermined distance to a target point. FIG. 1A illustrates obstacle information of one room, and information regarding each cell. Fixed obstacles 10 exist in the room, and the target point is marked as "Goal." The grid map of this example is divided into an area of 15×7 cells. One of eight directions is set to move from each cell to the Goal. The grid map shows that the target point is reached by moving straight from a start point marked as "Start", even though the fixed obstacles 10 exist. A cell of the area marked "Start" indicates moving to the right, and a subsequent cell also indicates moving to the right. According to the indicated directions on the grid map, the target point can be reached by moving straight to the right. Moving according to the grid map shown in FIG. 1A is performed with no problems in the case in which only the fixed obstacles 10 exist.

However, when a new obstacle is added to the room, the movement path needs to be changed. When a new obstacle 20 is found as illustrated in FIG. 1B, the grid map in a region 50 should be changed. Since it is difficult to move to the right because of the new obstacle 20, the movement path is replanned to move around the fixed obstacles 10 and new obstacle 20. FIG. 1C shows a movement path on the changed grid map.

As shown in FIG. 1C, since the D* algorithm moves in cell units, movement may not be performed in the shortest path. When moving straight between a point illustrated in FIG. 1C and the "Goal", a movement distance is 2.5 m. However, when movement between that same point and the "Goal" is performed in cell units, the movement distance is 3.5 m. To move in the shortest path, the size of a cell may be reduced. However, when the size of a cell is reduced, the size of data to be stored rapidly increases. For example, in a case in which a memory of 33 bytes is needed for a single cell, and a room having a size of 12×12 m is expressed in cells having a size of 20×20 cm, 3,600 cells must be calculated, and data of 3,600*33 bytes, i.e., 118,800 bytes, must be stored in memory. However, in a case in which the size of each cell is reduced to 10×10 cm, 14,400 cells must be calculated, and data of 14,000×33 bytes, i.e., 475,200 bytes, must be stored in memory. When the size of a cell is reduced by half, the size of data to be calculated is increased by a factor of four. Therefore, when the size of a cell is reduced to move in the shortest path, the size of the data to be stored is increased. Accordingly, it is preferable to not reduce the size of a cell.

Therefore, a method of moving in the shortest path while maintaining the size of a cell is desired. In addition, a method of moving in the shortest path by partially replanning a path when an unknown obstacle is encountered is desired, as well as an apparatus to perform the method.

SUMMARY OF THE INVENTION

The present invention provides a method of moving a mobile home appliance in a minimum cost path and avoiding obstacles using a grid map based on a cell, and an apparatus to perform the method.

The present invention also provides a method of moving in a minimum cost path in a direction that is not restricted by the positions of neighbor cells on a grid map, and an apparatus to perform the method.

Additional aspects and/or advantages of the invention will be set forth in part in the description which follows and, in part, will be apparent from the description, or may be learned by practice of the invention.

According to an aspect of the present invention, there is provided a method of moving in a minimum cost path using a grid map. The method includes calculating a move cost to a goal, from each of a plurality of cells comprised in a space in which a mobile home appliance moves, and planning a movement path to the goal according to the move cost, determining one or more via points at which a direction changes on the movement path, planning the minimum cost path from the movement path by selecting one or more shortest-distance via points from the via points, and moving from a first shortest-distance via point to a second shortest-distance via point.

The method may further include sensing an obstacle existing in a direction toward the second shortest-distance via point, replanning the minimum cost path in response to an obstacle being sensed in the direction toward the second shortest-distance via point, and moving to a third shortest-distance via point existing on the replanned minimum cost path.

According to another aspect of the present invention, there is provided a method of moving in a minimum cost path using a grid map, the method including dividing a space, in which a mobile home appliance moves, into a plurality of cells including a start point and a goal, and planning the minimum cost path according to cell-unit movement, and moving from a first cell to a second cell in the minimum cost path, wherein a movement direction is calculated from physical positions of the first and second cells in response to the first cell and the second cell not neighboring one another.

According to an embodiment of the present invention, a mobile home appliance including a moving unit to be moved by a dynamic force, and a control unit to plan a path in which the moving unit moves, and to control the moving unit to move in the path, wherein the control unit comprises a path planner to calculate a move cost to a goal, from each of a plurality of cells comprised in a space in which a mobile home appliance moves, and to plan a movement path to the goal according to the move cost, a via point finder to find one or more via points at which a direction changes on the movement path, and a minimum cost path planner to plan a minimum cost path from the movement path by selecting one or more shortest-distance via points from the via points.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 14 is a table comparing movement time between the conventional D* algorithm and embodiments of the present invention illustrated in FIGS. 12 and 13.

DETAILED DESCRIPTION OF THE PREFERRED EMBODIMENTS

Figure 1A:
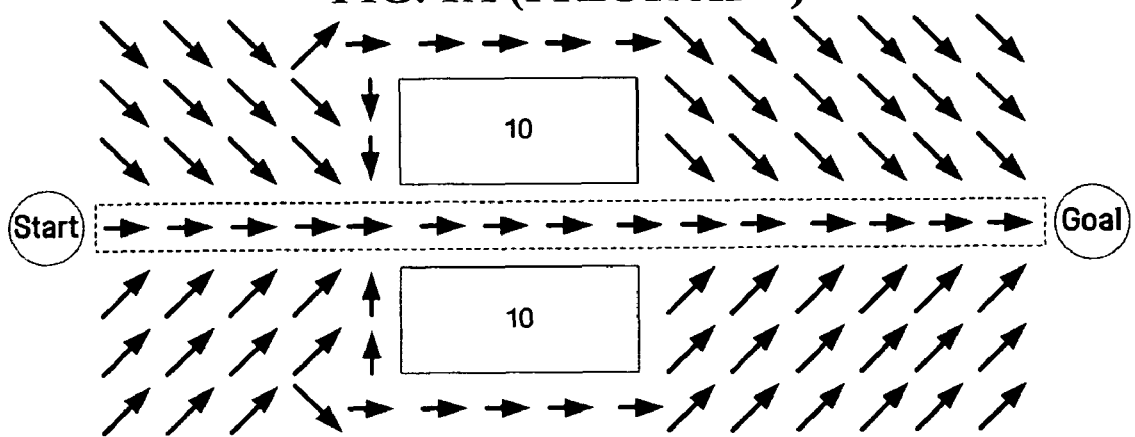
FIGS. 1A through 1C illustrate a conventional algorithm of planning an optimal path using a grid map.

Reference will now be made in detail to the embodiments of the present invention, examples of which are illustrated in the accompanying drawings, wherein like reference numerals refer to the like elements throughout. The embodiments are described below to explain the present invention by referring to the figures.

A shortest path refers to a path having a shortest distance to a goal. However, a move cost depends on many factors, such as a movement angle and calculation time, in addition to a movement distance. In descriptions of some embodiments of the present invention, the move cost is determined according to the distance, and the shortest path is defined as the minimum cost path, but the present invention is not restricted thereto. The minimum cost path may be the shortest path, or may be any path minimizing a cost needed for movement, i.e., a move cost.

Figure 2A:
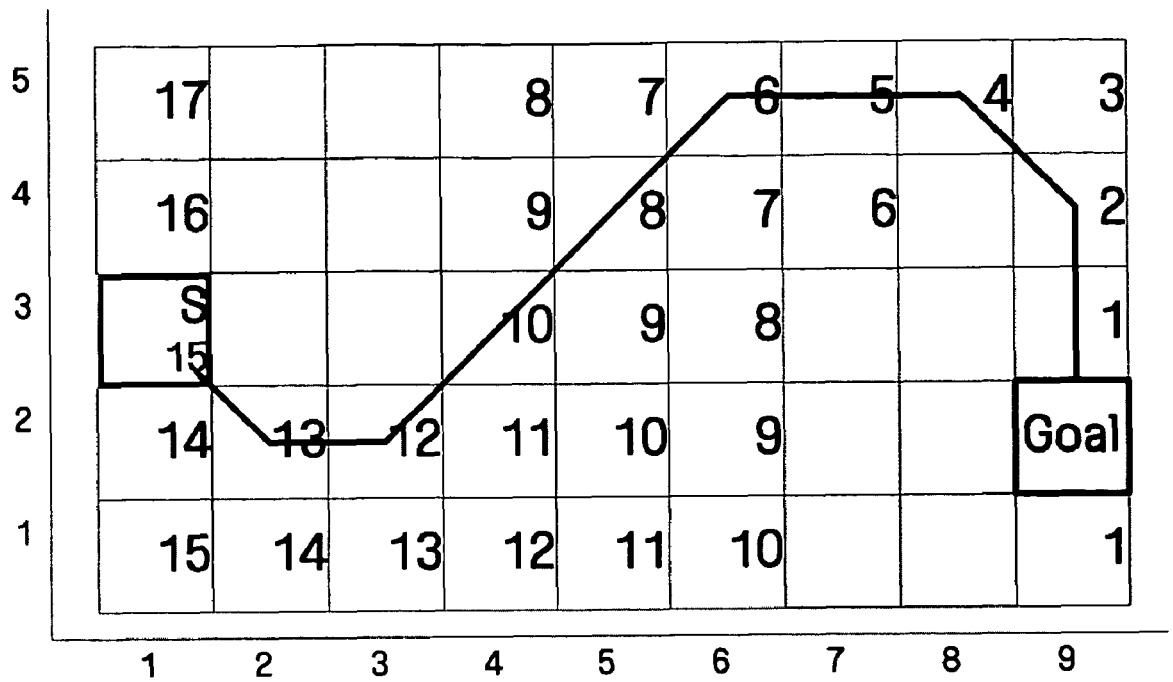
FIGS. 2A through 2C illustrate a map and a path and a shortest path planned according to the map, according to an embodiment of the present invention.
Figure 2B:
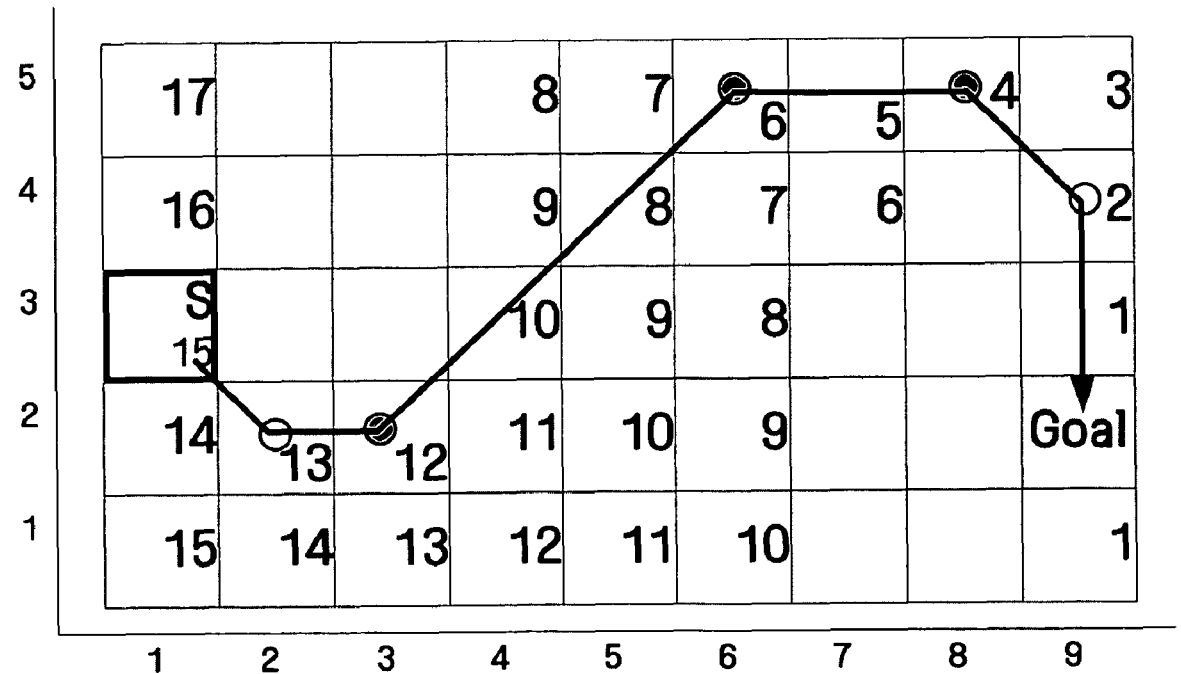
Figure 2C:
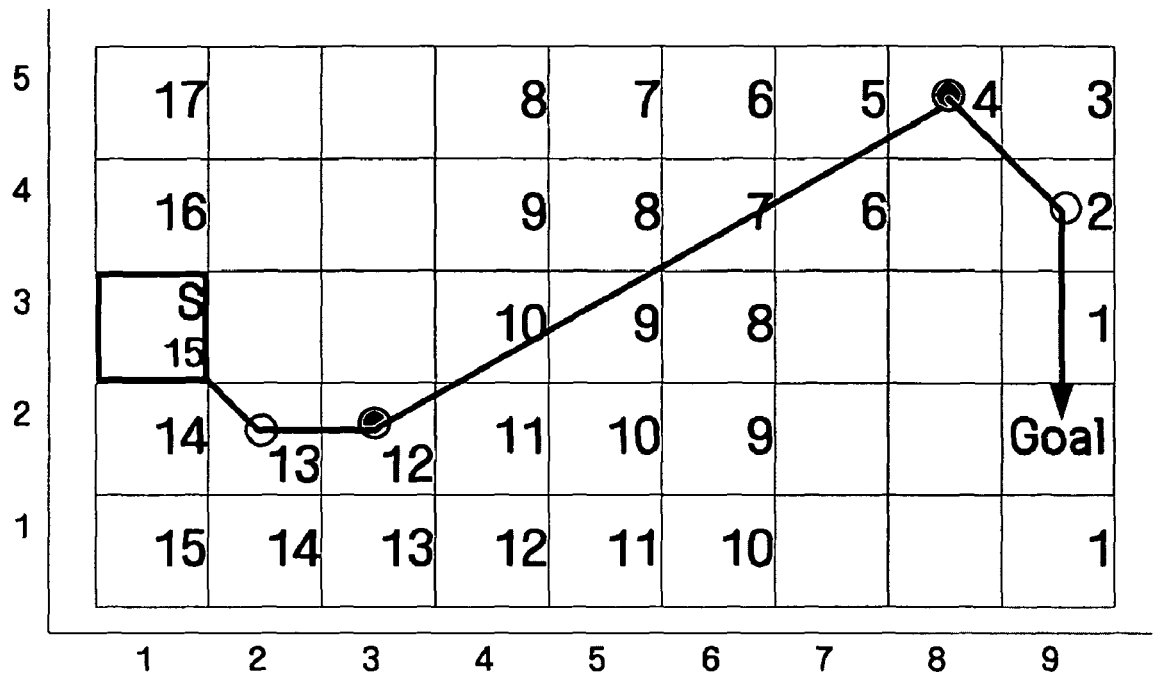

FIGS. 2A through 2C illustrate a map and a path and a shortest path planned according to the map, according to an embodiment of the present invention.

FIG. 2A illustrates a result of generating map information according to information that has been input with respect to a movement area of a mobile home appliance and planning a path. A method of generating a map will be described with reference to FIGS. 3A and 3B later in this description. The map shown in FIGS. 2A through 2C is divided into an array of 9×5 cells, and therefore includes a total of 45 cells. Each cell is a result of calculating an accumulated distance to a goal, or calculating the accumulated distance and a move cost. The accumulated distance or the move cost is just an example of a weight needed to find a shortest distance from each cell to the goal. Hereinafter, a coordinate value will be used to indicate a particular cell. A start point S has a horizontal coordinate of 1 and a vertical coordinate of 3, and is thus expressed as Cell(1,3). In a case in which a cost needed to move from each cell to the goal is expressed as "move_cost", the move cost at Cell(1,3) is expressed as "move_cost(Cell(1,3))", and the move cost has a value of 15.

In FIG. 2A, a cell that does not have a move cost indicates an obstacle which hinders the movement of the mobile home appliance. After the move cost at each cell is calculated as shown in FIG. 2A, a path to the goal is planned. The path may be set by selecting a subsequent cell following a current cell. Cell(1,2), Cell(1,4), and Cell(2,2) each neighbor the cell with the start point S, i.e., Cell(1,3). Among those cells, Cell(2,2) has the lowest move cost. After moving to Cell(2,2), a cell having a lowest move cost is selected from among the cells neighboring Cell(2,2). Cell(1,2), Cell(1,1), Cell(2,1), Cell(3,1), and Cell(3,2) each neighbor Cell(2,2), and have weights 14(Cell(1,2)), 15(Cell(1,1)), 14(Cell(2,1)), 13(Cell(3,1)), and 12(Cell(3,2)). Among those cells, Cell(3,2), which has the lowest move cost, is selected. In such manner in which a cell having the lowest move cost is selected from among available cells, a path to the target is planned.

In response to the path being planned, one or more via points can be set as illustrated in FIG. 2B. A via point is a point at which rotation occurs or a direction is changed on the path. In FIG. 2B, Cell(2,2), Cell(3,2), Cell(6,5), Cell(8,5), and Cell(9,4) are via points. The start point and the goal may be via points. The via points are set to plan a shortest path as shown in FIG. 2C. For example, in a path including Cell(3,2), Cell(6,5), and Cell(8,5), it can be seen that Cell(6,5) is unnecessary in moving from Cell(3,2) to Cell(8,5). Accordingly, a straight path from Cell(3,2) to Cell(8,5) is the shortest path between those two cells. FIG. 2C shows a shortest path found based on the via points. It is determined whether straight movement from each via point to a first subsequent via point or to a second subsequent via point is possible, and an unnecessary via point is erased. In FIG. 2B, Cell(6,5) is an unnecessary via point and is thus erased, and, therefore, the shortest path is set as illustrated in FIG. 2C.

Figure 3A:
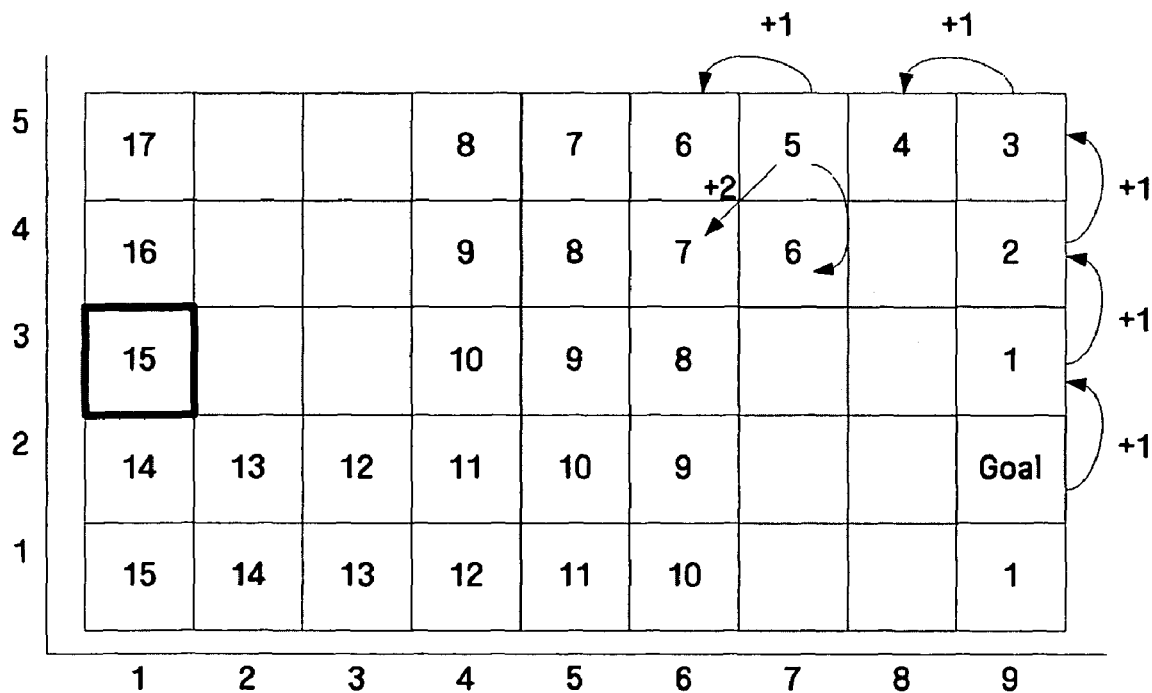
FIGS. 3A and 3B illustrate a procedure of generating a map according to an embodiment of the present invention.
Figures 3B, 4A:
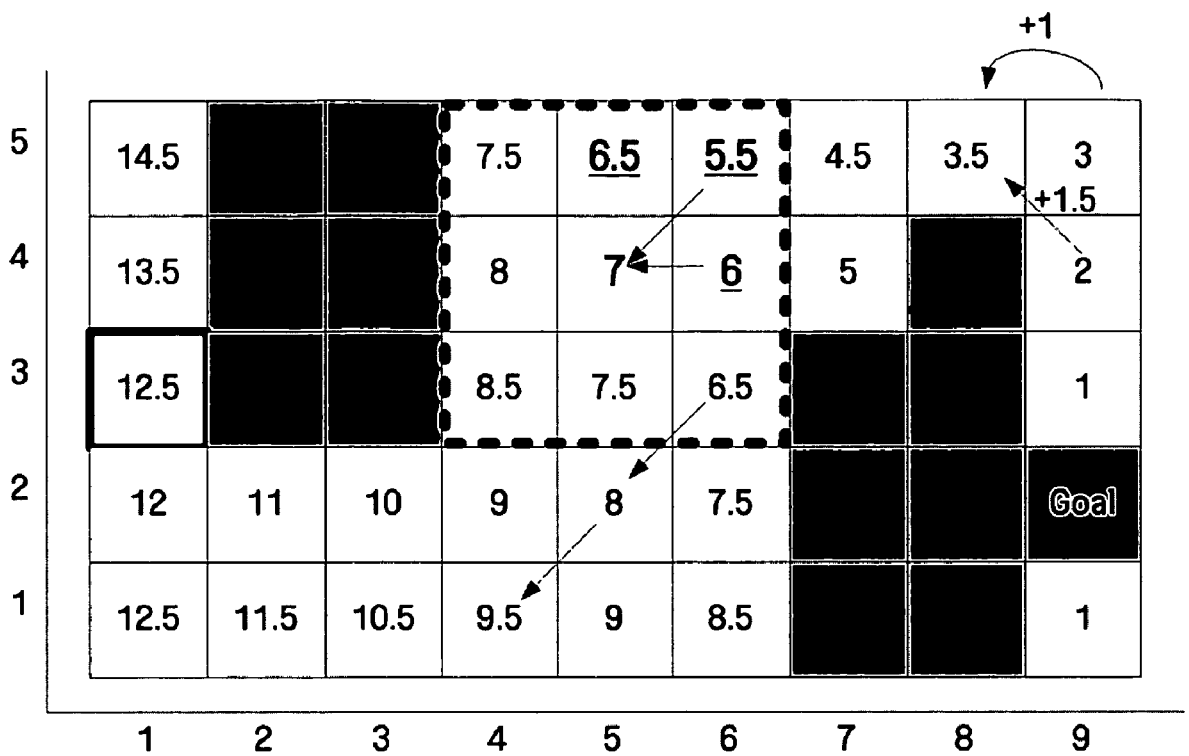
FIG. 4A illustrates a function of setting a shortest path based on a via point according to an embodiment of the present invention.

FIGS. 3A and 3B illustrate a method of generating a map according to an embodiment of the present invention. In FIGS. 3A and 3B, each cell of the map has a quadrilateral shape. However, each cell may have other geometrical shapes, such as, for example, a hexagonal or triangular shape. FIG. 3A illustrates a map generated by calculating a cost of moving up, down, to the left, or to the right as 1, and a cost of moving in a diagonal direction as 2. A cost or weight given to each cell is a minimum cost needed to move to a goal through movement from cell to cell. For example, Cell(9,3), positioned immediately above the goal, i.e., Cell(9,2), by one cell, has a cost of 1. Similarly, Cell(9,4), positioned immediately above Cell(9,3) by one cell, has a cost of 2. In such manner, a weight, or a move cost, for each cell is set. A move cost for Cell(8,5) can be calculated from Cell(9,4) and Cell(9,5). A move cost for Cell(9,4) is 2, and a cost of moving from Cell(9,4) to Cell(8,5) is 2. A move cost for Cell(9,5) is 3, and a cost of moving from Cell(9,5) to Cell(8,5) is 1. Accordingly, a minimum move cost given to Cell(8,5) is 4. As described above, a cost is calculated as +2 at a diagonal movement, and as +1 at an upward, downward, leftward, or rightward movement on the basis of the goal, and a lowest value is selected as the weight or move cost of each cell.

When the move cost of Cell(8,5) is calculated, Cell(7,5) and Cell(7,4) are not considered, even though they neighbor Cell(8,5), because they have not had definite weights or move costs calculated yet. For convenience, a predetermined initial value may be given to every cell before calculating a move cost of each cell. Here, the predetermined initial value is greater than a maximum move cost for every cell. For example, a move cost for each of the 9×5 cells illustrated in FIG. 3A does not exceed 1,000. Accordingly, a value of 1,000 may be set as an initial value for each cell. In this case, a move cost of a cell can be more easily calculated from its neighbor cells for which a minimum move cost has already been set.

FIG. 3B illustrates a map generated by calculating a cost of moving up, down, to the left, or to the right as 1, and a cost of moving in a diagonal direction as 1.5. A weight or a move cost for each cell is calculated in the same manner as described with reference to FIG. 3A.

Referring to FIG. 3B, movement to a total of 8 neighbor cells is allowed from Cell(5,4). The move costs of Cell(5,4) are obtained according to Cell(5,5), Cell(6,5), and Cell(6,4), but not Cell(4,3), Cell(4,4), Cell(4,5), Cell(5,3), and Cell(6, 3), which have a maximum value before a minimum move cost is calculated, as follows:

(1) when moving from Cell(5,5) to Cell(5,4), a move cost for Cell(5,4) is 7.5, which is calculated as move_cost(Cell(5, 5))+1;

(2) when moving from Cell(6,5) to Cell(5,4), a move cost for Cell(5,4) is 7, which is calculated as move_cost(Cell(6, 5))+1.5; and (3) when moving from Cell(6,4) to Cell(5,4), a move cost for Cell(5,4) is 7, which is calculated as move_cost(Cell(6, 4))+1.

Among the obtained move costs, a value of 7 is minimum, and therefore, the minimum move cost of Cell(5,4) is determined as 7. Also, a minimum move cost of Cell(5,2) is calculated as 8 from neighbor Cell(6,3) in a diagonal direction, and a minimum move cost of Cell(4,1) is calculated as 9.5 from neighbor Cell(5,2) in a diagonal direction.

The calculations illustrated in FIGS. 3A and 3B may be expressed as "move_cost(Cell(i,j)=min{move_cost(Cell(a, b)), i−1≦a≦i+1, j−1≦b≦j+1}". Here, the map includes n×m cells to which a maximum value of 1,000 is allocated as an initial value, and the move_cost of a goal is set to 0.

A path from a start point to the goal is set through cells having minimum move costs among neighbor cells based on calculated map information, as described above with reference to FIGS. 2A through 2C.

FIG. 4A illustrates a function of setting a shortest path based on a via point, according to an embodiment of the present invention.

When an arrangement V[n] has information regarding all via points, whether a path from a via point V[cnt] to another via point V[subcnt] exists can be determined using a function PathExists( ). The function PathExists( ) can be implemented in various ways, and determines whether movement without passing an intermediate via point, with consideration of a position of an obstacle, is possible. When movement between non-neighboring via points is possible, an unnecessary intermediate via point is erased for that movement using a function EraseDummyViapoint( ).

Figure 4B:
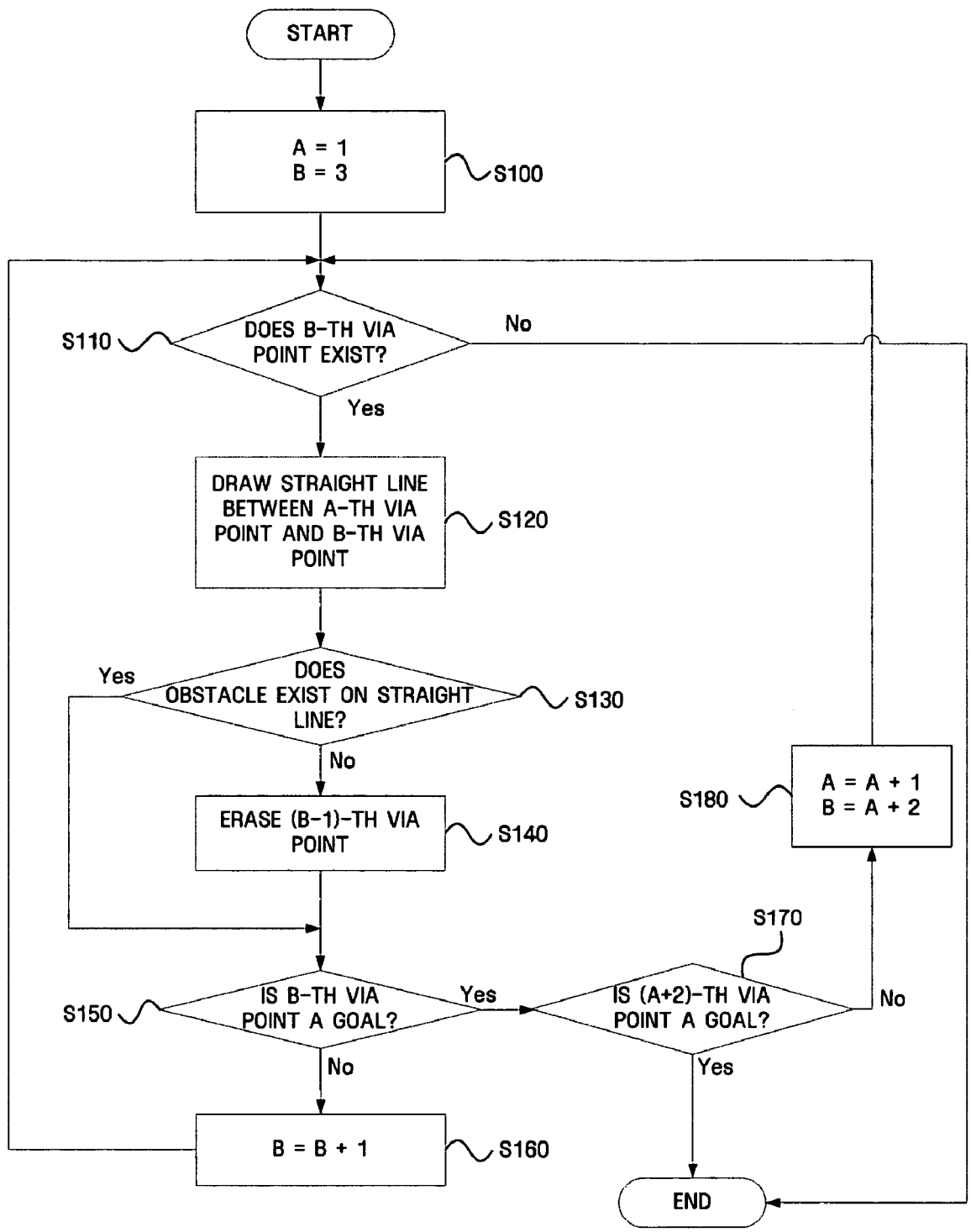
FIG. 4B is a flowchart illustrating a method of finding a via point for the shortest path according to an embodiment of the present invention.

FIG. 4B is a flowchart illustrating a method of finding a via point for the shortest path according to an embodiment of the present invention.

Finding a via point for the shortest path includes determining whether movement between non-neighboring via points is possible, and corresponds to the function PathExists( ) illustrated in FIG. 4A. First, two via points are selected and given indexes A and B, respectively. In operation S100, a first via point and a third via point are selected. In response to determining that a B-th via point exists in operation S110, a straight line is drawn between the B-th via point and an A-th via point in operation S120. The straight line may be a movement path. In operation S130, it is determined whether an obstacle exists on the straight line. If it is determined that no obstacle exists on the straight line, movement is possible without passing a (B−1)-th via point, and therefore the (B−1)-th via point is erased in operation S140. In operation S150, it is determined whether the B-th via point is a goal. If it is determined that the B-th via point is not the goal, a subsequent via point is selected in operation S160. However, if it is determined that the B-th via point is the goal, it is determined whether a (A+2)-th via point is the goal in operation S170. If it is determined that the (A+2)-th via point is not the goal, a reflexive task of setting a via point for the shortest path is performed in operation S180. In operation S180, the index A is increased by 1 to select a subsequent via point, and the index B is set to A+2.

If it is determined that the B-th via point is not the goal, operation S160 is performed to find a via point for the shortest path based on a subsequent via point.

Meanwhile, if it is determined that an obstacle exists in operation S130, straight movement is not possible between the A-th via point and the B-th via point. Accordingly, it is determined whether the B-th via point is the goal in operation S150, and operation S160 or S170 is performed according to the result of the determination.

Figure 5:
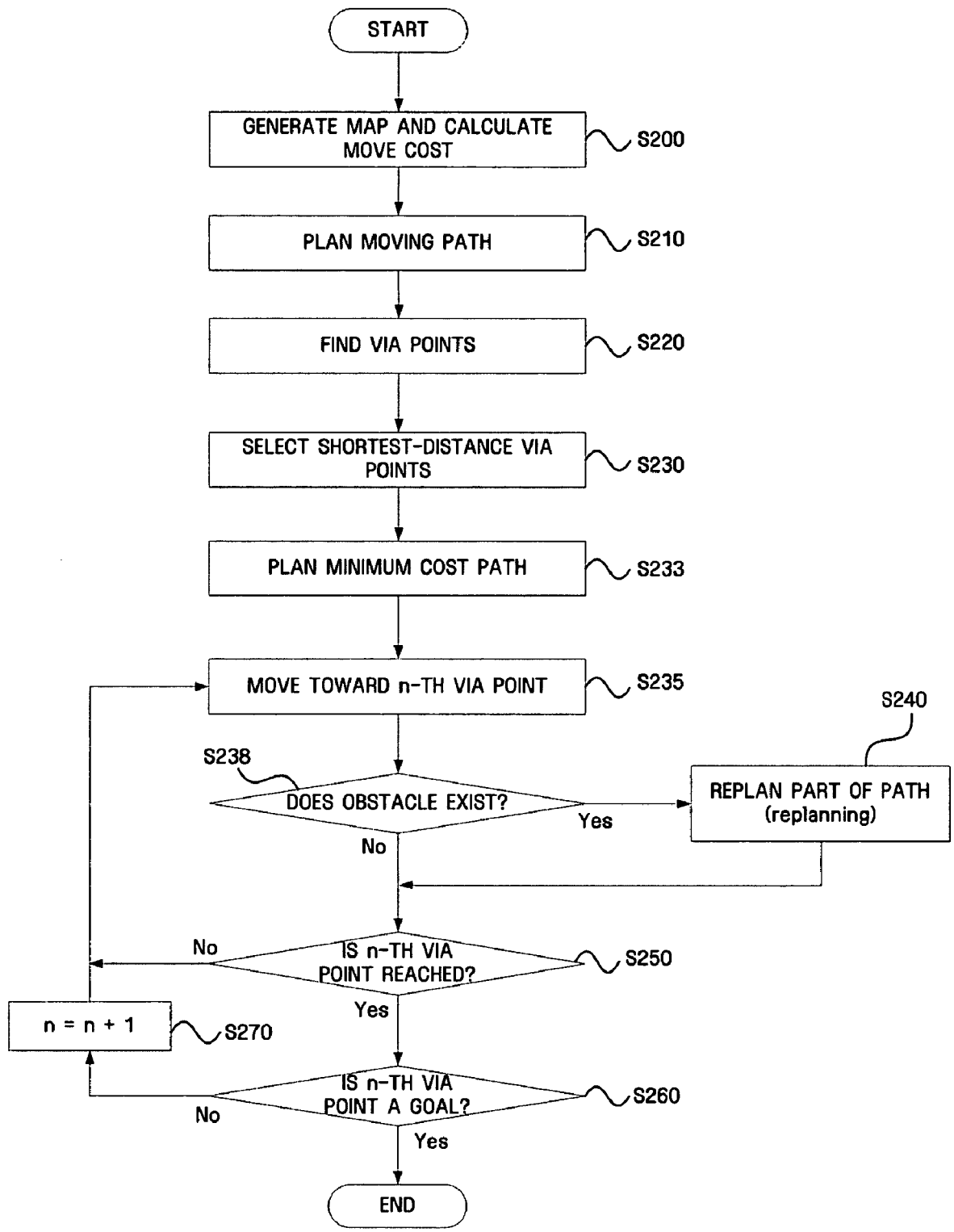
FIG. 5 is a flowchart illustrating a method of planning a path and performing a movement in the planned path according to an embodiment of the present invention.

FIG. 5 is a flowchart illustrating a method of planning a path and performing a movement in the planned path according to an embodiment of the present invention.

In operation S200, a map is generated and a move cost for each cell is calculated. The map may be generated according to a cost needed to move to a goal, as illustrated in FIG. 2A. In addition, information regarding a movement space may be received from a user to generate the map, or data that was stored in advance may be used. The information regarding the movement space may include, for example, information regarding a size of the movement space and cells, and information regarding positions of obstacles existing in the movement space.

When a cost needed for moving is calculated, a weight may be given to a hindering factor that may occur in movement between cells. In an embodiment of the present invention, a cell has a quadrilateral shape, but may have other geometrical shapes such as, for example, a hexagonal shape or a triangular shape. After the map is generated, a movement path is planned in operation S210. Here, the movement path is an initial path from a start point to a goal, and can be planned using a method of moving to a cell while incurring the least possible cost.

In response to the movement path being planned, cells corresponding to via points are found in operation S220. A via point is a point at which a movement direction changes. In operation S230, an unnecessary via point is erased based on the via points, as described with reference to FIGS. 2A through 2B, to reduce a movement distance. To erase a via point, a position of an obstacle is considered. In response to unnecessary via points being erased, shortest-distance via points are obtained in operation S233. The shortest-distance via points are via points remaining after unnecessary via points are erased from the via points found in operation S220. A path formed by the shortest-distance via points is a minimum cost path. In response to the minimum cost path being set before starting movement, the movement is made toward an n-th via point according to the setting result in operation S235 to sequentially pass through the shortest-distance via points in the minimum cost path. Initially, "n" is set on the basis of a first via point. However, an obstacle may be sensed by a collision sensor during movement to a subsequent via point, or may be sensed by a distance sensor before moving to the subsequent via point. Accordingly, in operation S238, it is determined whether an obstacle exists during or before movement. If it is determined that an obstacle exists, the minimum cost path is replanned in operation S240. Here, only a part of the minimum cost path, rather than the entire minimum cost path, may be replanned. According to a position of the obstacle, a movement path to the n-th via point on the minimum cost path is replanned. If it is determined that no obstacle exists in operation S238, it is determined whether the n-th via point is reached in operation S250. If it is determined that the n-th via point is not reached, the procedure returns to operation S235 to continue the movement toward the n-th via point. If it is determined that the n-th via point is reached, it is determined whether the n-th via point is the goal in operation S260. If it is determined that the n-th via point is not the goal, "n" is increased by 1 in operation S270 to move to a subsequent via point, and then the procedure returns to operation S235. However, if it is determined that the n-th via point is the goal, the procedure ends.

Figure 6:
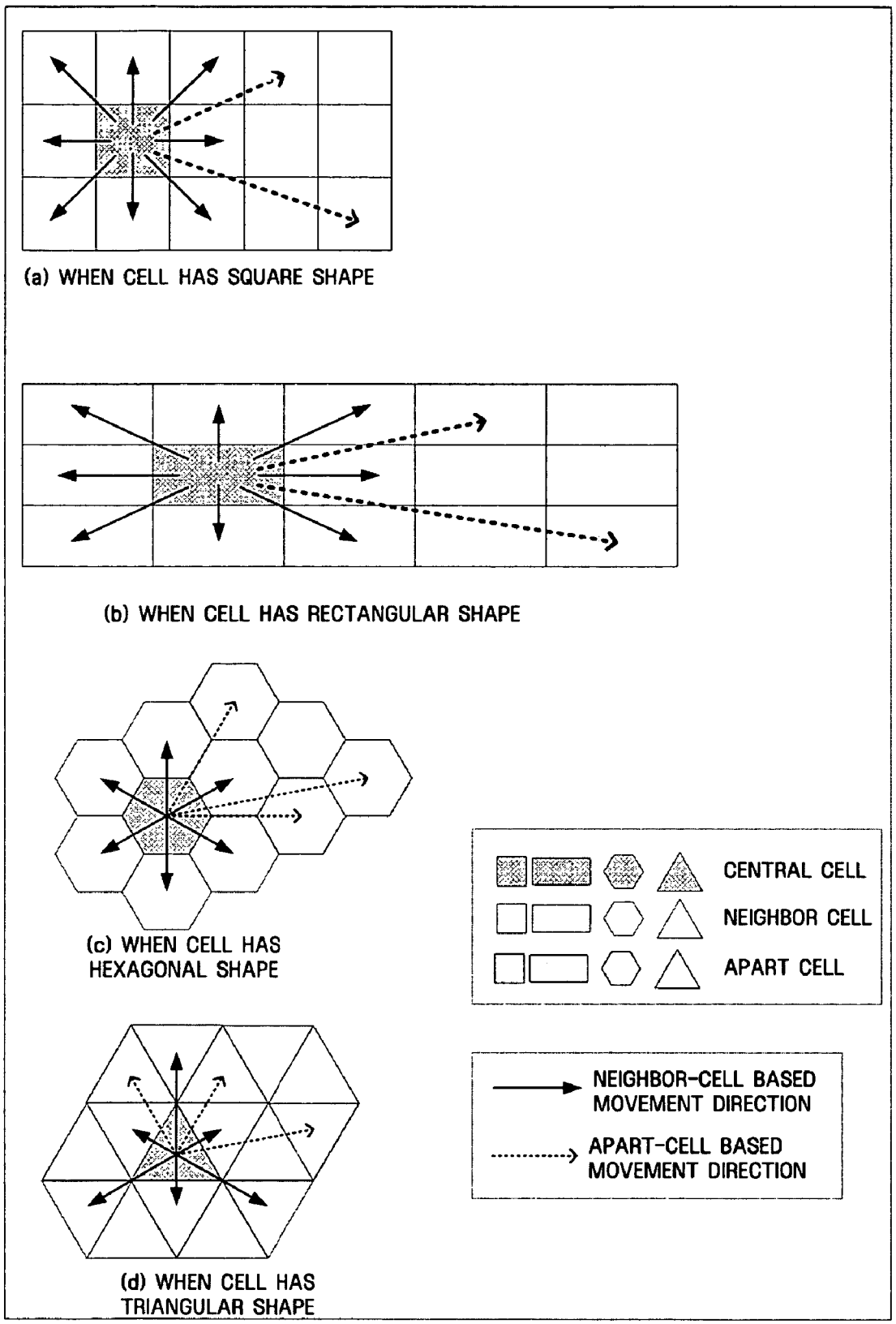
FIG. 6 illustrates a neighbor-cell based movement direction and an apart-cell based movement direction according to an embodiment of the present invention.

FIG. 6 illustrates a neighbor-cell based movement direction, and an apart-cell based movement direction, according to an embodiment of the present invention.

Figure 1B:
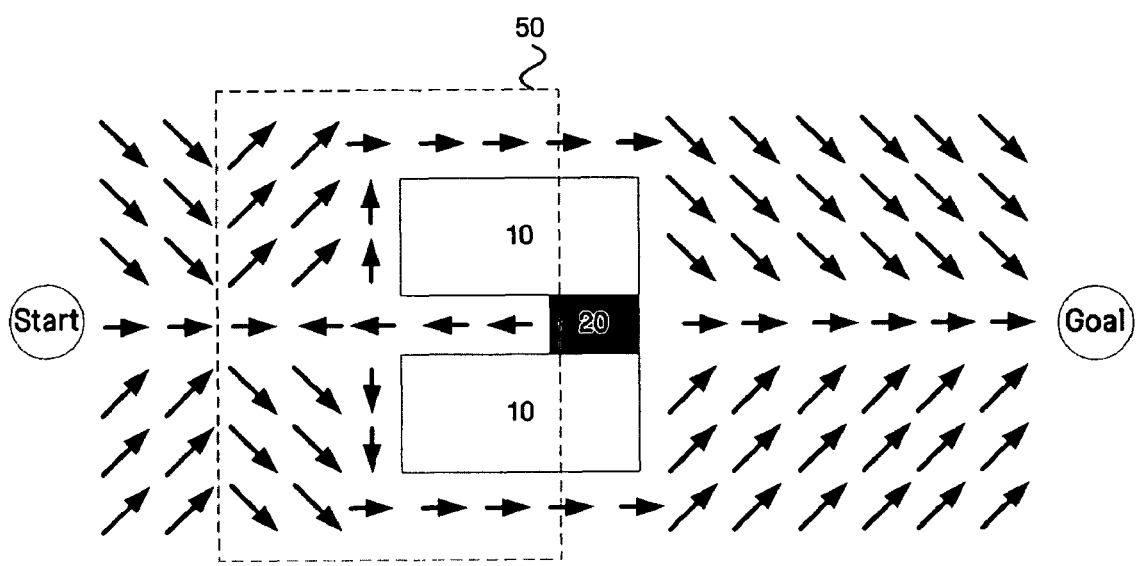
Figure 1C:
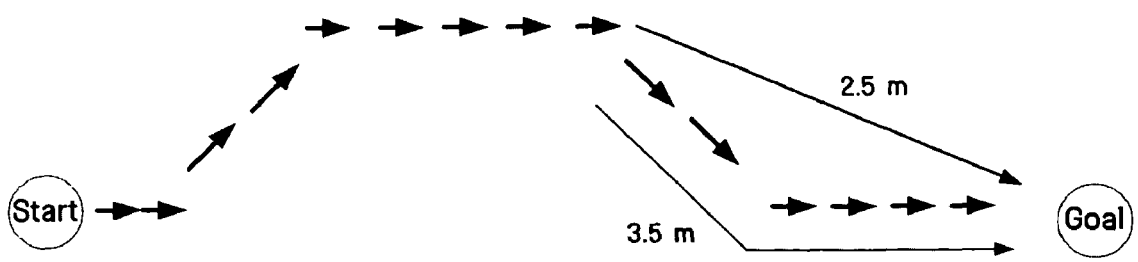

One respect in which the conventional D* algorithm is different from an embodiment of the present invention is that a movement direction from each cell is limited when a minimum cost path is calculated. The difference appears in the relationship between a cell and neighbor cells. When the movement direction from each cell is not various, but is fixed, it is difficult to move in a shortest path as described with reference to FIGS. 1A through 1C. Meanwhile, when movement is not based on a cell or the size of a cell is reduced, the movement may be almost made in the shortest path, but the amount of data to be calculated rapidly increases. Accordingly, when the movement direction from each cell includes directions according to neighbor cells, and is set according to a relationship between the cell and each apart cell, while information regarding the entire space is constituted and calculated in units of cells, various movement direction may be defined. As a result, movement in the shortest path can be accomplished.

FIG. 6 illustrates various cells. Cells are defined by dividing a space by a predetermined size and may have a geometrical shape such as, for example, a square shape, a rectangular shape, a hexagonal shape, or a triangular shape as illustrated in FIG. 6.

In FIG. 6, cells are classified into three types: a central cell at which a mobile home appliance is positioned, a neighbor cell neighboring the central cell, and an apart cell that does not neighbor the central cell.

In the conventional D* algorithm, a movement direction from a central cell to a neighbor cell is defined for movement. However, a movement direction to a neighbor cell is limited. For example, in a case in which a cell has a quadrilateral shape as shown in FIG. 6, (a) and (b), the number of movement directions from each cell is restricted to 8 (solid arrows). When a cell has a hexagonal or triangular shape as shown in (c) or (d) of FIG. 6, the number of movement directions is restricted to 6 (solid arrows). However, movement directions to apart cells are possible in embodiments of the present invention. In FIG. 6, movement directions based on apart cells are expressed by dotted lines. Movement directions based on both the neighbor and apart cells present more diverse movement possibilities while cell based calculation is performed. As a result, performance of movement can be increased.

According to an embodiment of the present invention, movement directions of the mobile home appliance are largely classified into two types of directions: a neighbor-cell based movement direction and an apart-cell based movement direction.

The neighbor-cell based movement direction is calculated from a relationship between a central cell and a neighbor cell, and is usually referred to when moving by one cell. The apart-cell based movement direction is calculated from a relationship between a central cell and an apart cell, and is usually referred to when moving a distance greater than the size of a single cell. In an embodiment of the present invention, a movement path determining initial via points is planned using the neighbor-cell based movement direction, and then a minimum cost path is planned using both the neighbor-cell based movement direction and the apart-cell based movement direction. As a result, the mobile home appliance can move in diverse directions without being restricted by the definition of the cells. Although the mobile home appliance can move in diverse directions, a movement path is calculated based on the cells. Accordingly, the amount of calculation does not increase, and a delay caused by the calculation can be avoided.

Figure 7A:
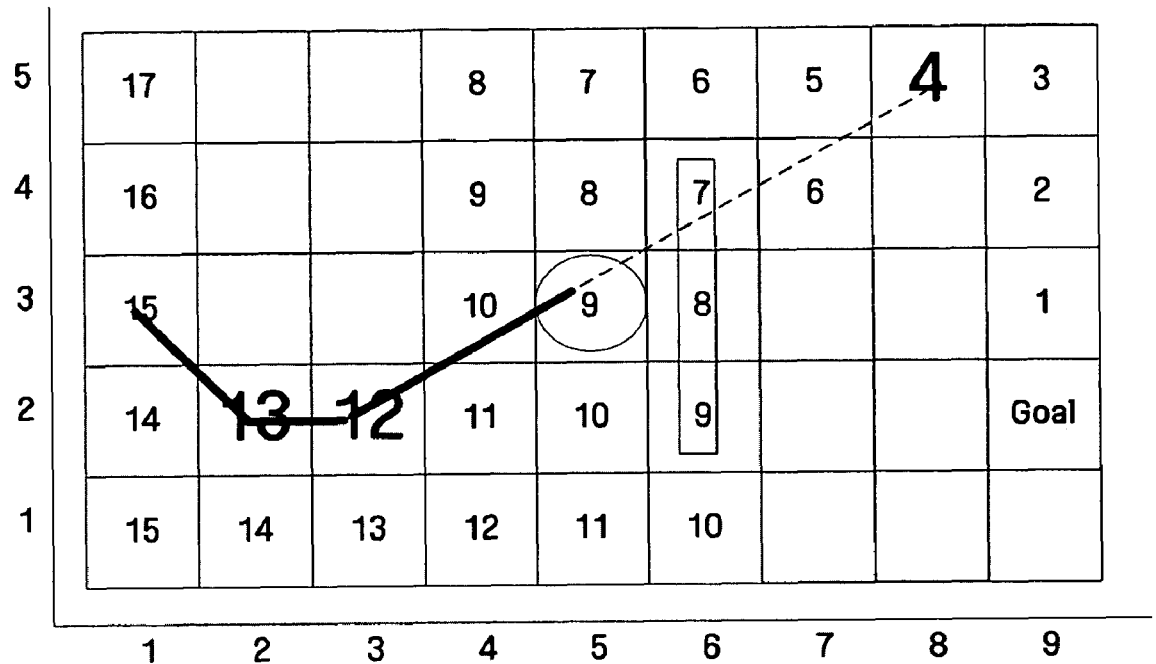
FIGS. 7A and 7B illustrate a method of replanning a path in response to a mobile home appliance contacting or otherwise sensing an obstacle at a close range according to an embodiment of the present invention.
Figure 7B:
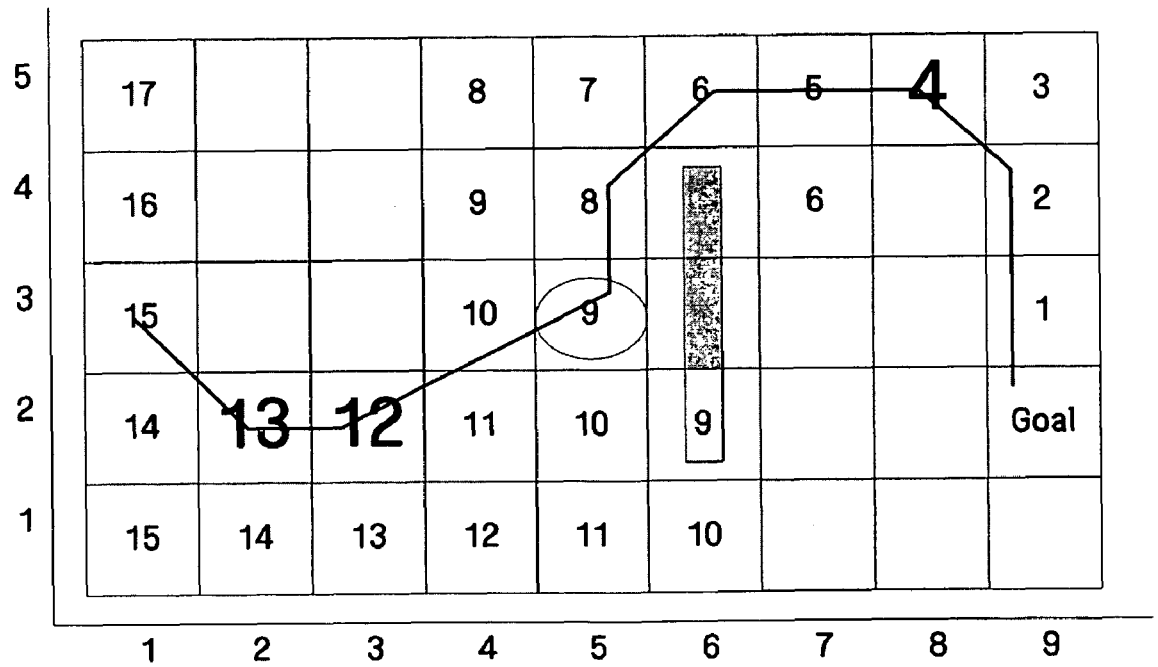

FIGS. 7A and 7B illustrate a method of replanning a path in response to a mobile home appliance contacting or otherwise sensing an obstacle at a close range according to an embodiment of the present invention.

In FIGS. 7A and 7B, it is assumed that there was no obstacle in Cell(6,2), Cell(6,3), and Cell(6,4) when a path was initially planned, but an obstacle now exists at those three cells. Accordingly, Cell(6,2), Cell(6,3), and Cell(6,4) have minimum move costs of 9, 8, and 7, respectively, and Cell(6, 4) must be passed through for movement in a minimum cost path from Cell(1,3) to the Goal at Cell(9,2). While a mobile home appliance departing from Cell(1,3) is moving toward Cell(8,5) via Cell(2,2) and Cell(3,2), it senses the obstacle upon reaching a position of Cell(5,3). The obstacle may be sensed, for example, using a sensor sensing an obstacle at a close range, or a collision sensor sensing an obstacle upon contact with the obstacle. The mobile home appliance recognizes that moving straight to Cell(8,5) is impossible due to the obstacle, and replans a part of the minimum cost path, as described in operation S240 illustrated in FIG. 5. The minimum cost path is not entirely changed, only a part of the minimum cost path to Cell(8,5), in which movement is impossible at present, is replanned. When replanning the minimum cost path, via points are found while moving from a current position to a cell having a lowest move cost. As a result, the replanned part of the minimum cost path has Cell (5,3), Cell(5,4), Cell(6,5) and Cell(8,5) as via points. The function illustrated in FIG. 4A may be applied to the newly found via points to select shortest-distance via points. In the embodiment of the present invention illustrated in FIGS. 7A and 7B, no unnecessary via point exist, and, therefore, the mobile home appliance can move in the changed minimum cost path illustrated in FIG. 7B.

Meanwhile, if a path to the Cell(8,5) does not exist, a move cost of each cell is recalculated throughout the map, and new via points are found. Alternatively, a map may be regenerated with respect to an area from a current position to a goal, and a move cost of each cell may be recalculated.

Figure 8A:
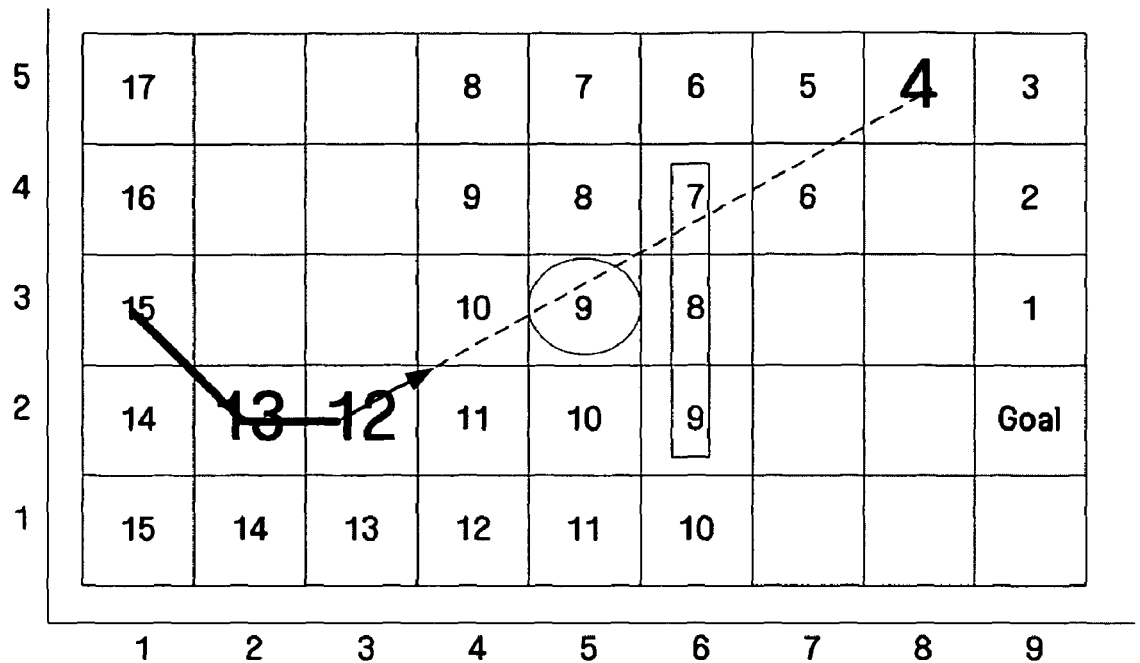
FIGS. 8A and 8B illustrate a method of replanning a path in response to an obstacle being sensed at a remote place according to an embodiment of the present invention.
Figure 8B:
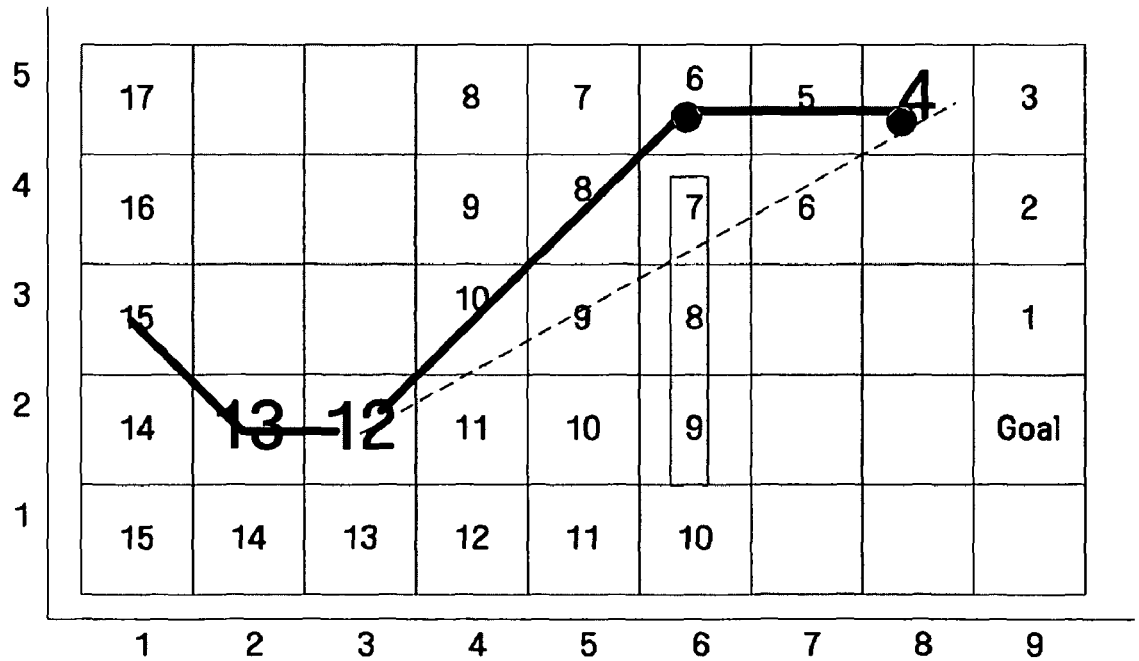

FIGS. 8A and 8B illustrate a method of replanning a path in response to an obstacle being sensed at a remote place according to an embodiment of the present invention.

FIGS. 7A and 7B illustrate a method of sensing an obstacle at a close range or at the contact with the obstacle, and moving while avoiding the obstacle. Referring to FIGS. 8A and 8B, a mobile home appliance determines whether an obstacle exists on a path to a subsequent via point using a distance sensor before moving to the subsequent via point. Referring to FIG. 8A, the mobile home appliance departs from Cell(1,3) and moves via Cell(2,2) and Cell(3,2). There is no obstacle on a path from Cell(1,3) to Cell(2,2), or a path from Cell(2,2) to Cell(3,2). The mobile home appliance determines whether an obstacle exists on a path from Cell(3,2) to Cell(8,5) using a sensor, and determines that an obstacle exists in Cell(6,4). Since it is impossible to move straight to Cell(8,5), the path is replanned. In other words, the mobile home appliance recognizes that an obstacle exists in Cell(6,2), Cell(6,3), and Cell (6,4), which had not been known before departure, using a remote sensor. The mobile home appliance defines Cell(6,2), Cell(6,3), and Cell(6,4) as having an obstacle, and partially replans the path. The replanned path is expressed by a solid line in FIG. 8B. When the path is replanned, new via points are found. A minimum cost path can be recalculated based on the new via points. Since no unnecessary via point to be erased exists on the path illustrated in FIG. 8B, the path illustrated in FIG. 8B is the minimum cost path. Accordingly, the mobile home appliance moves to Cell(8,5) in the path illustrated in FIG. 8B, and thereafter, moves in an initially planned path.

Figure 9:
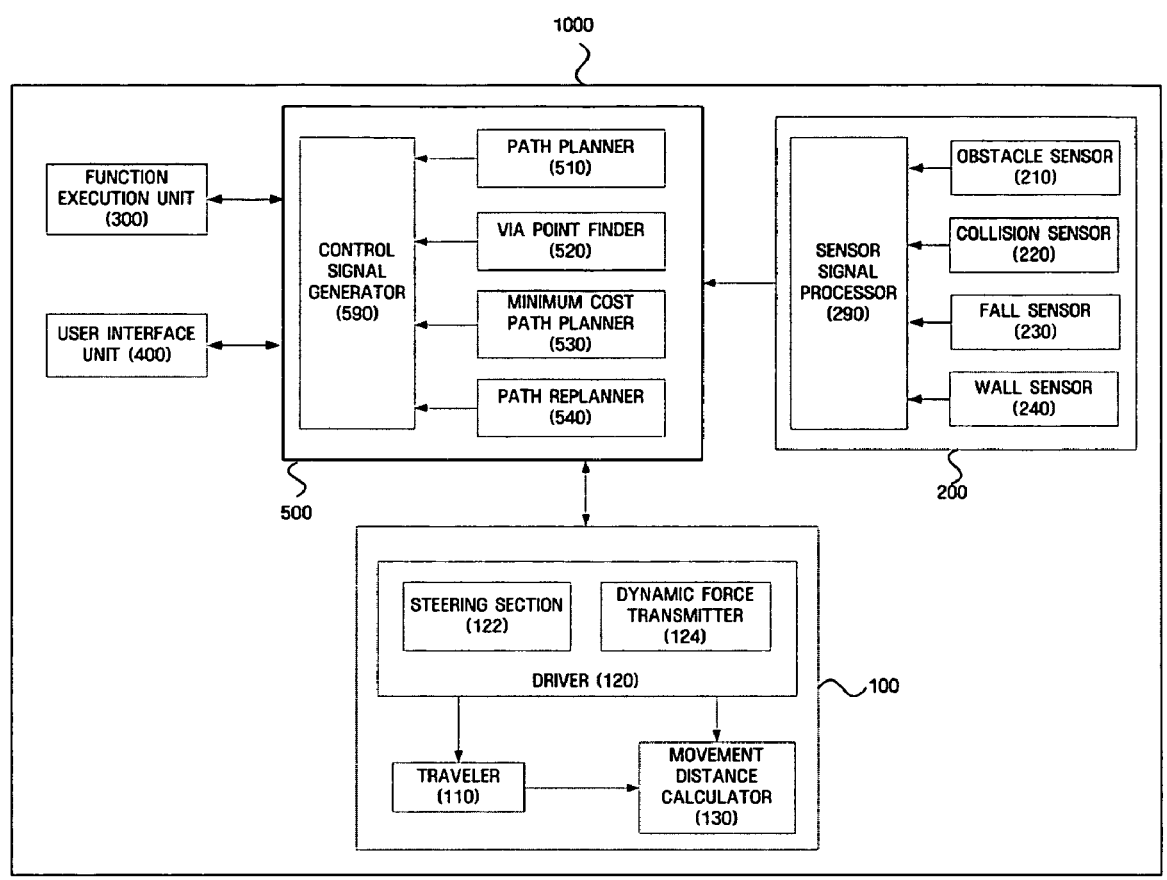
FIG. 9 is a block diagram illustrating a mobile home appliance according to an embodiment of the present invention.

FIG. 9 is a block diagram illustrating a mobile home appliance 1000 according to an embodiment of the present invention.

The term 'module', as used herein, refers to, but is not limited to, a software or hardware component, such as a Field Programmable Gate Array (FPGA) or Application Specific Integrated Circuit (ASIC), which performs certain tasks. A module may advantageously be configured to reside on the addressable storage medium, and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a communication system.

The mobile home appliance 1000 includes a moving unit 100, a sensing unit 200, a function execution unit 300, a user interface unit 400, and a control unit 500 to control other elements.

The function execution unit 300 executes a function of the mobile home appliance 1000. For example, in a case in which the mobile home appliance 1000 is a humidifier, the function execution unit 300 provides a humidifying function. In a case in which the mobile home appliance 1000 is an air purifier, the function execution unit 300 provides an air purification function. In a case in which the mobile home appliance 1000 is a cleaner, the function execution unit 300 may provide a vacuum cleaning function. In addition, the function execution unit 300 may selectively provide a function of the mobile home appliance 1000, the performance of which is enhanced through movement.

The user interface unit 400 receives a selection of a function and a control command from a user, and outputs information regarding a current state or a current function. The user interface unit 400 may receive an input signal through, for example, a remote control, or a function key, or an input button disposed in the mobile home appliance 1000. The user interface unit 400 may include a display window to output the information. When output information is simple, the display window may be implemented using a luminescent device such as a light-emitting diode (LED).

In addition, the user interface unit 400 allows a user to input information regarding a movement space in which the mobile home appliance 1000 moves. In response to the user setting information such as the size of a movement space, the size of a cell, the position of an obstacle, and/or the position of a goal, the control unit 500 plans a path based on the information, and calculates a minimum cost path so that the mobile home appliance 1000 moves in the minimum cost path.

The sensing unit 200 includes an obstacle sensor 210, a collision sensor 220, a fall sensor 230, a wall sensor 240, and a sensor signal processor 290. The sensing unit 200 senses an obstacle or contact with an obstacle during movement of the mobile home appliance 1000.

The obstacle sensor 210 determines whether an obstacle exists within a predetermined distance or in a movement direction. When sensing an obstacle, the obstacle sensor 210 may emit an ultrasonic wave or an infrared signal, and calculate a time from the emission to reception of the reflected wave or signal. A sensor using an ultrasonic wave, an infrared ray, and/or a laser beam are merely examples of typical sensors which may be incorporated in the obstacle sensor 210. The obstacle sensor 210 may be a sensor sensing a distance by other methods or through other devices.

The collision sensor 220 senses contact of the mobile home appliance 1000 with any other object during the movement. The collision sensor 220 may be implemented by providing a plurality of small switches, which generate an ON/OFF signal according to contact, to the outside of the mobile home appliance 1000. Before the movement, the mobile home appliance 1000 has a map of the movement space, recognizes where obstacles are positioned, and calculates a path to a goal avoiding the obstacles. Accordingly, an obstacle sensed by the collision sensor 220 may be an unknown or unprecedented one.

The fall sensor 230 senses a dent, a fast slope on the floor, a step, etc., and prevents the mobile home appliance 1000 from advancing. The fall sensor 230 can sense a dent by determining whether a signal sent in an advancing direction is received back uniformly. In other words, the fall sensor 230 makes a determination according to the uniformity of a signal reflected from the surface on which the mobile home appliance 1000 is moving, and may sense a protrusion from that surface.

The wall sensor 240 senses a wall appearing on the map.

The wall sensor 240 senses a wall and keeps the mobile home appliance 1000 separated from the wall by a predetermined distance. Upon sensing a wall, the wall sensor 240 may emit an ultrasonic wave or an infrared signal, and calculate a time from the emission to reception of the reflected wave or signal. A sensor using an ultrasonic wave, an infrared ray, and/or a laser beam are merely examples of typical sensors which may be incorporated into the wall sensor 240. A sensor sensing a distance using other methods or devices may be used as the wall sensor 240. The wall sensor 240 may calculate a distance to the wall and update the information of the map.

The sensor signal processor 290 transmits a signal generated by one or more of the sensors 210 through 240 to the control unit 500. The sensor signal processor 290 processes the signal to represent which sensor generates which type of signal. For example, in the case in which the obstacle sensor 210 senses an object within a distance of 50 cm and generates a signal, the sensor signal processor 290 converts the signal into information indicating that the object exists within a distance of 50 cm, and transmits the information to the control unit 500.

The control unit 500 initially generates a map based on information regarding a movement space which is input by a user, calculates a movement path, and controls the moving unit 100. In addition, the control unit 500 changes or replans the movement path according to information regarding an obstacle which is input from the sensing unit 200 during movement. The control unit 500 includes a path planner 510, a via point finder 520, a minimum cost path planner 530, a path replanner 540, and a control signal generator 590.

The path planner 510 generates a map, calculates a weight of each cell, and plans an initial path. In other words, the path planner 510 performs operations S200 and S210 illustrated in FIG. 5. The path planner 510 may generate a map based on data received from the user interface unit 400.

The via point finder 520 finds a via point based on the path planned by the path planner 510. A via point is a place at which a movement direction changes. A via point is found as follows. When any cell existing on a movement path is represented by "PathPoint(n)", it is determined whether a particular cell represented by PathPoint(i) exists on a straight line between PathPoint(i−1) and PathPoint(i+1) in order to determine whether PathPoint(i) is a via point. If it is determined that PathPoint(i) exists on the straight line, PathPoint(i) is determined to not be a via point. However, if it is determined that PathPoint(i) does not exist on the straight line, PathPoint(i) is determined to be a via point.

The minimum cost path planner 530 resets the initial path, which is planned according to conventional cell-unit movement, and thus is not optimized, according to via points to plan an optimal path. As described with reference to FIGS. 4A and 4B, it is determined whether movement between non-neighboring via points is possible, and an unnecessary via point is erased according to the determination result.

When an initial minimum cost path is planned by the path planner 510, the via point finder 520, and the minimum cost path planner 530, information regarding the initial minimum cost path is transmitted to the control signal generator 590, and the control unit 500 controls the moving unit 100 to move. During movement, in a case in which a new obstacle is sensed by the sensing unit 200 before or after contact with the obstacle, the path replanner 540 plans a path avoiding the obstacle according to information received from the sensing unit 200, as described with reference to FIGS. 7A through 8B. Thereafter, new via points are found by the via point finder 520, and a new minimum cost path is planned by the minimum cost path planner 530.

The control signal generator 590 controls the moving unit 100 according to information regarding a movement direction and a movement distance, this information being generated by the path planner 510, the via point finder 520, and the minimum cost path planner 530. The control signal generator 590 controls elements of the moving unit 100 to control the movement direction and distance. In addition, the control signal generator 590 may transmit information regarding a moving speed to the moving unit 100. Moreover, the control signal generator 590 may receive a moved distance and a moved direction, which are fed back from the moving unit 100, and calculate a current position.

The moving unit 100 moves according to information controlled by the control unit 500. The moving unit 100 moves the mobile home appliance 1000. The moving unit 100 largely includes a driver 120 to generate a dynamic force, a traveler 110 to execute movement using the dynamic force, and a movement distance calculator 130 to calculate a moved distance.

To move the moving unit 100, information regarding a direction in which the moving unit 100 is to move, and a distance by which the moving unit 100 is to move, is needed. This information includes information generated by the path replanner 540 of the control unit 500 according to information received from the sensing unit 200.

For example, position information of an obstacle and a wall collected by the sensing unit 200 is sent to the control unit 500, which transmits a command indicating a traveler to be moved, and a moving amount of the traveler, to the moving unit 100. The control unit 500 collects information obtained by elements performing their functions, and operates other elements according to the information.

The traveler 110 moves the moving unit 100 and a body of the mobile home appliance 1000, which is connected to the moving unit 100. The traveler 110 may be implemented as, for example, a wheel, a caterpillar, or a leg used in a movement of a robotic device.

The driver 120 transmits a dynamic force to the traveler 110 and controls the direction of the traveler 110. The driver 120 includes a steering section 122 and a dynamic force transmitter 124. The dynamic force transmitter 124 may be implemented as a motor generating a dynamic force from an energy source such as, for example, electric power. The steering section 122 controls the direction of the traveler 110. Direction control may be accomplished by controlling at least one of a plurality of travelers 110. The direction control may be accomplished by setting different rotation speeds of wheels at opposite sides in a case in which the travelers 100 are implemented as wheels.

The movement distance calculator 130 calculates a distance by which the traveler 110 has moved. For example, the movement distance calculator 130 may count the number of rotations of each of the left and right travelers 110, and multiply the number of rotations by the diameter of each traveler 110, thereby calculating the moved distance. The movement distance calculator 130 may refer to the dynamic force transmitted from the driver 120 when calculating the moved distance. For example, the movement distance calculator 130 may count the number of rotations of the motor and calculate a moved distance using the count result and an angle of the steering section 122. In addition, the movement distance calculator 130 may complementarily calculate a moved distance using distance information generated by the driver 120 and distance information obtained from the traveler 110.

Figure 10:
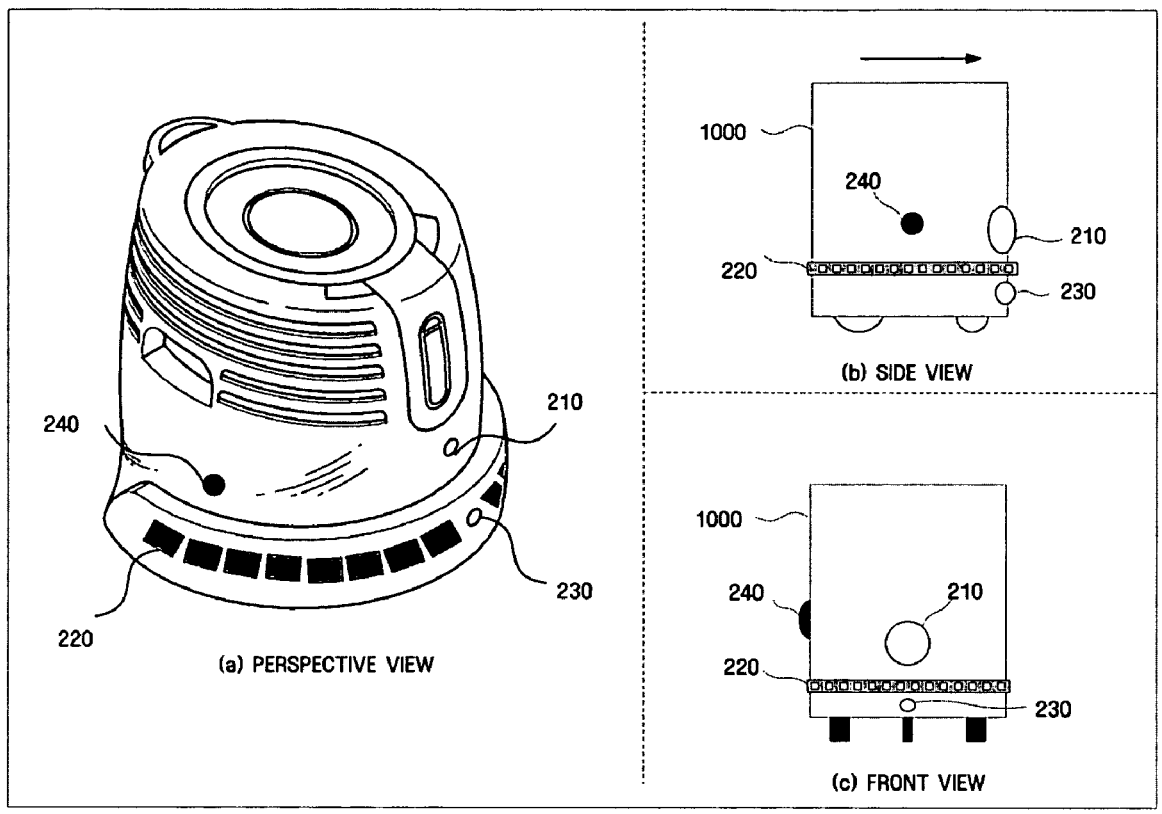
FIG. 10 illustrates elements of a sensing unit according to an embodiment of the present invention.

FIG. 10 illustrates elements of the sensing unit 200 according to an embodiment of the present invention.

The mobile home appliance 1000 may be any mobile appliance such as, for example, a mobile humidifier, a mobile cleaner, or a mobile air purifier. The moving unit 100 is provided to the bottom of the mobile home appliance 1000. The sensing unit 200 provided in the mobile home appliance 1000 of this embodiment includes four types of sensors: the obstacle sensor 210 sensing an obstacle ahead; the collision sensor 220 sensing contact with another object; the fall sensor 230 sensing a dent or a protrusion in an advancing direction; and the wall sensor 240 sensing a wall. In FIG. 10, (a), (b), and (c) are perspective, side, and front views, respectively, of the mobile home appliance 1000 including the sensing unit 200. In (b), an arrow indicates a direction in which the mobile home appliance 1000 moves.

The obstacle sensor 210 senses an obstacle existing in a front area relative to the mobile home appliance 1000 during movement. In particular, the obstacle sensor 210 is appropriate to determine whether an obstacle exists in a movement direction before moving to a subsequent via point, as illustrated in FIGS. 8A and 8B. In addition, the obstacle sensor 210 is appropriate to determine how much area a new obstacle is occupying.

The collision sensor 220 senses a collision with another object or an obstacle during movement. As illustrated in the drawings, the collision sensor 220 may be implemented by providing a plurality of small switches generating an ON/OFF signal on the outside of the mobile home appliance 1000, so that the collision sensor 220 determines in which direction an object or obstacle exists in response to the mobile home appliance 1000 contacting the object or obstacle during movement. In response to a contact with a new obstacle being sensed, a previous path is changed and replanned according to the sensing result of the collision sensor 220, as illustrated in FIGS. 7A and 7B.

The fall sensor 230 senses irregularities in a surface such as, for example, a dent, a fast slope on the floor, a step, etc., and prevents the mobile home appliance 1000 from advancing. The fall sensor 230 can sense a dent by determining whether a signal sent in an advancing direction is received back uniformly. Accordingly, in a case in which the fall sensor 230 is provided in a lower portion of the mobile home appliance 1000, sensing can be accurately performed. Alternatively, the fall sensor 230 may be provided in an upper portion of the mobile home appliance 1000 to sense a dent at a distance. Like the obstacle sensor 210, the fall sensor 230 can determine whether movement is possible before departing to a subsequent via point.

The wall sensor 240 senses a wall and prevents the mobile home appliance 1000 from crashing against the wall. In addition, in response to a path being planned according to a value input by a user or stored in advance, the wall sensor 240 allows incorrect information regarding a wall position to be changed. The wall sensor 240 may be provided on a side of the mobile home appliance 1000 to adjust a distance between the mobile home appliance 1000 and an object existing on the side of a movement direction.

Figure 11:
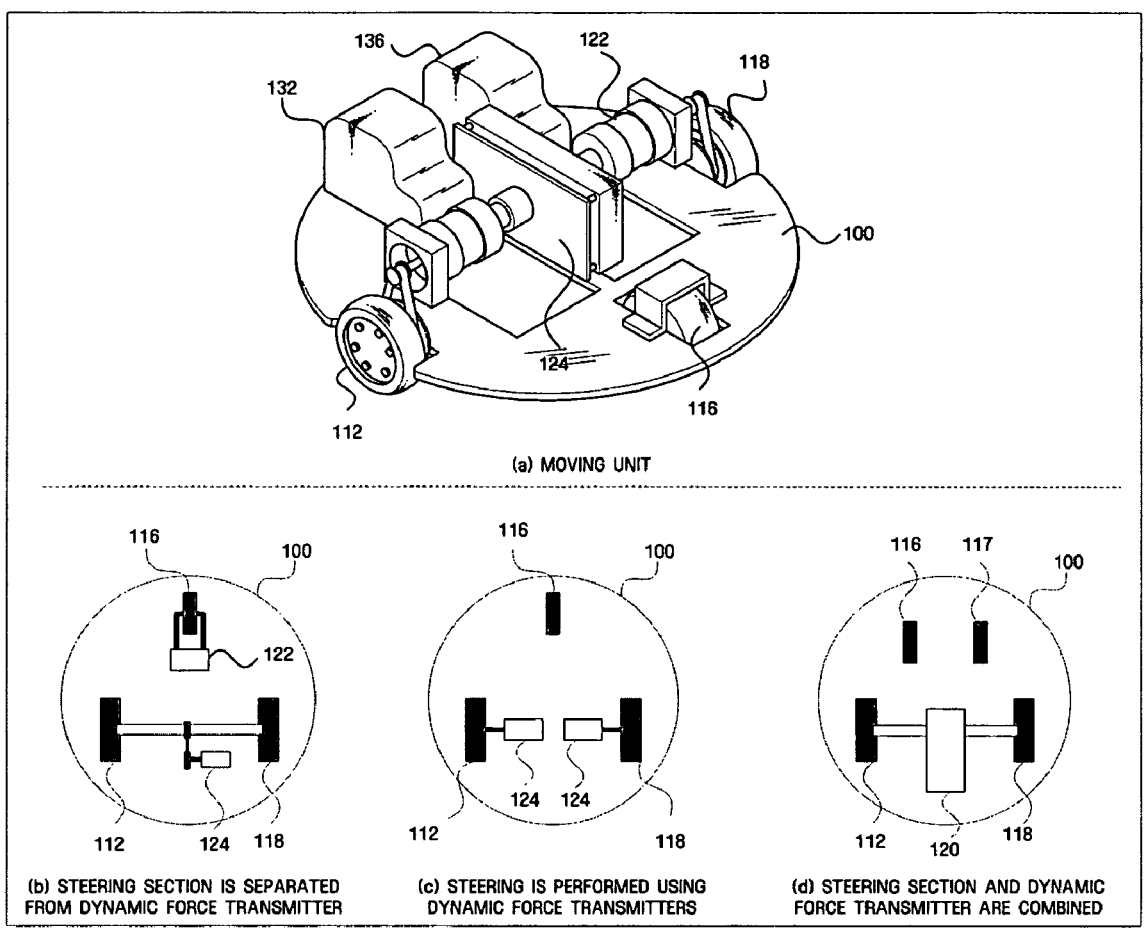
FIG. 11 illustrates elements of a moving unit according to different embodiments of the present invention.

FIG. 11 illustrates elements of the moving unit 100 according to different embodiments of the present invention.

Referring to FIG. 11(*a*), which illustrates the moving unit 100 according to an embodiment of the present invention, travelers 112, 116, and 118 move the moving unit 100 and the body of the mobile home appliance 1000, which is connected to the moving unit 100.

The travelers 112, 116, and 118 may be implemented using, for example, wheels or a plurality of legs used to move a robotic device. The driver 120 transmits a dynamic force to the travelers 112, 116, and 118, and controls the direction of the travelers 112, 116, and 118.

The driver 120 includes the steering section 122 and the dynamic force transmitter 124. The dynamic force transmitter 124 includes a motor to generate a dynamic force from an energy source such as electric power. The steering section 122 controls the direction of the travelers 112 and 118. Direction control is possible by controlling at least one of the travelers 112, 116, and 118. For example, although not shown in (a), the direction control can be accomplished by turning the traveler 116 to be positioned in a movement direction to the left or right.

Movement distance calculators 132 and 136 calculate distances, respectively, which the travelers 112 and 118 have moved. For example, the movement distance calculators 132 and 136 respectively count the numbers of rotations of the left and right travelers 112 and 118, and multiply the numbers of rotations by the respective diameters of the travelers 112 and 118.

FIG. 11(*b*) illustrates the moving unit 100 in which the steering section 122 is separated from the dynamic force transmitter 124, according to another embodiment of the present invention. The steering section 122 is provided at the traveler 116, and the dynamic force transmitter 124 transmits a dynamic force to the other travelers 112 and 118.

FIG. 11(*c*) illustrates the moving unit 100 in which steering is performed using only the dynamic force transmitter 124, according to still another embodiment of the present invention. Two dynamic force transmitters 124 are provided at the travelers 112 and 118, respectively, and control the speed of the travelers 112 and 118 to change a direction. For example, to move to the left, the rotation speed of the right traveler 118 is set to be higher than that of the left traveler 112 using the dynamic force transmitters 124.

FIG. 11(*d*) illustrates the moving unit 100 in which a steering section and a dynamic force transmitter are combined, according to yet another embodiment of the present invention. The steering section and the dynamic force transmitter are provided within a driver 120. Movement and direction change are performed by the travelers 112 and 118, which is similar to the moving unit 100 according to the embodiment illustrated in (a) in FIG. 11.

Figure 12:
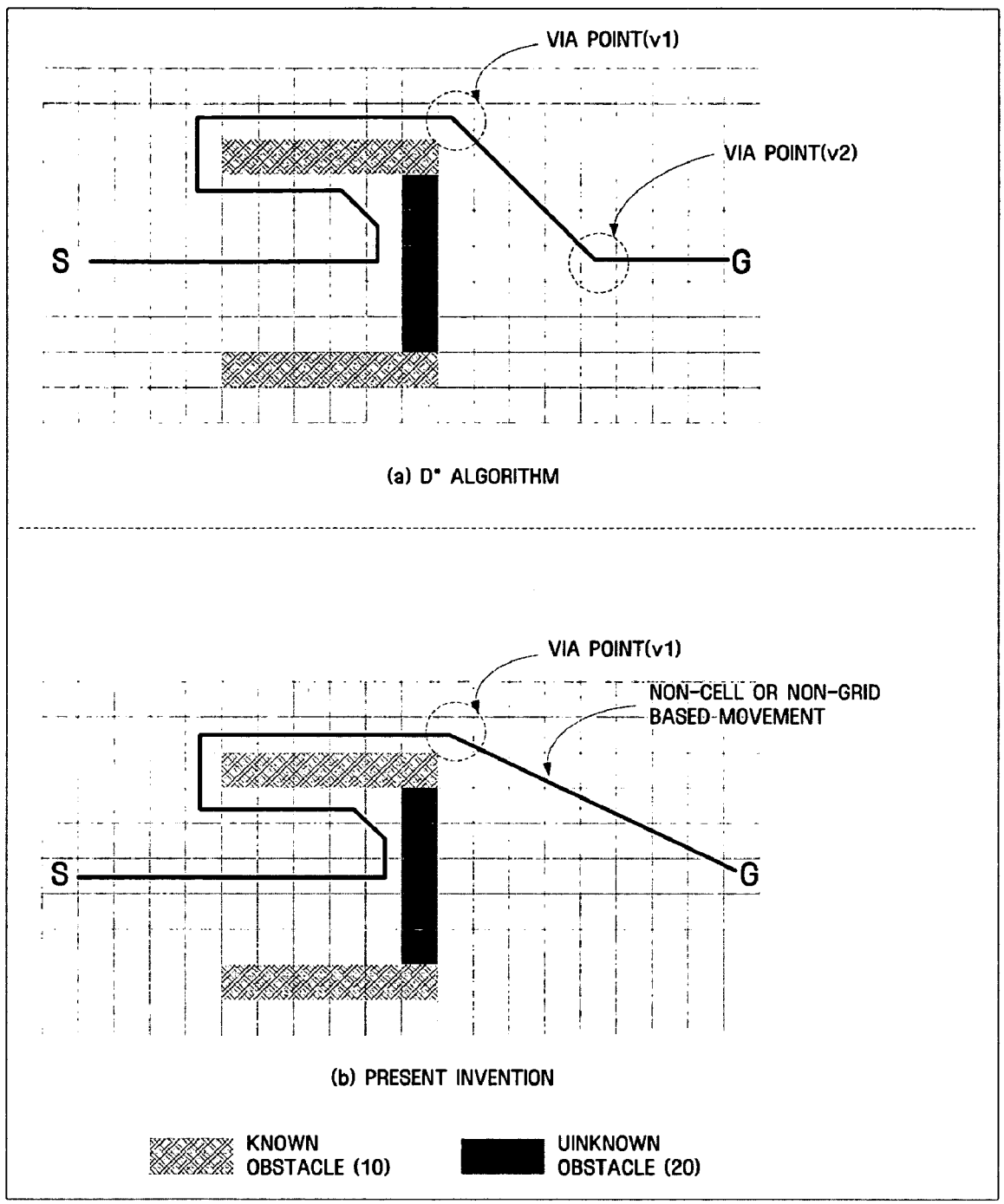
FIG. 12 illustrates an example of comparison between a conventional D* algorithm and an embodiment of the present invention.
Figure 13:
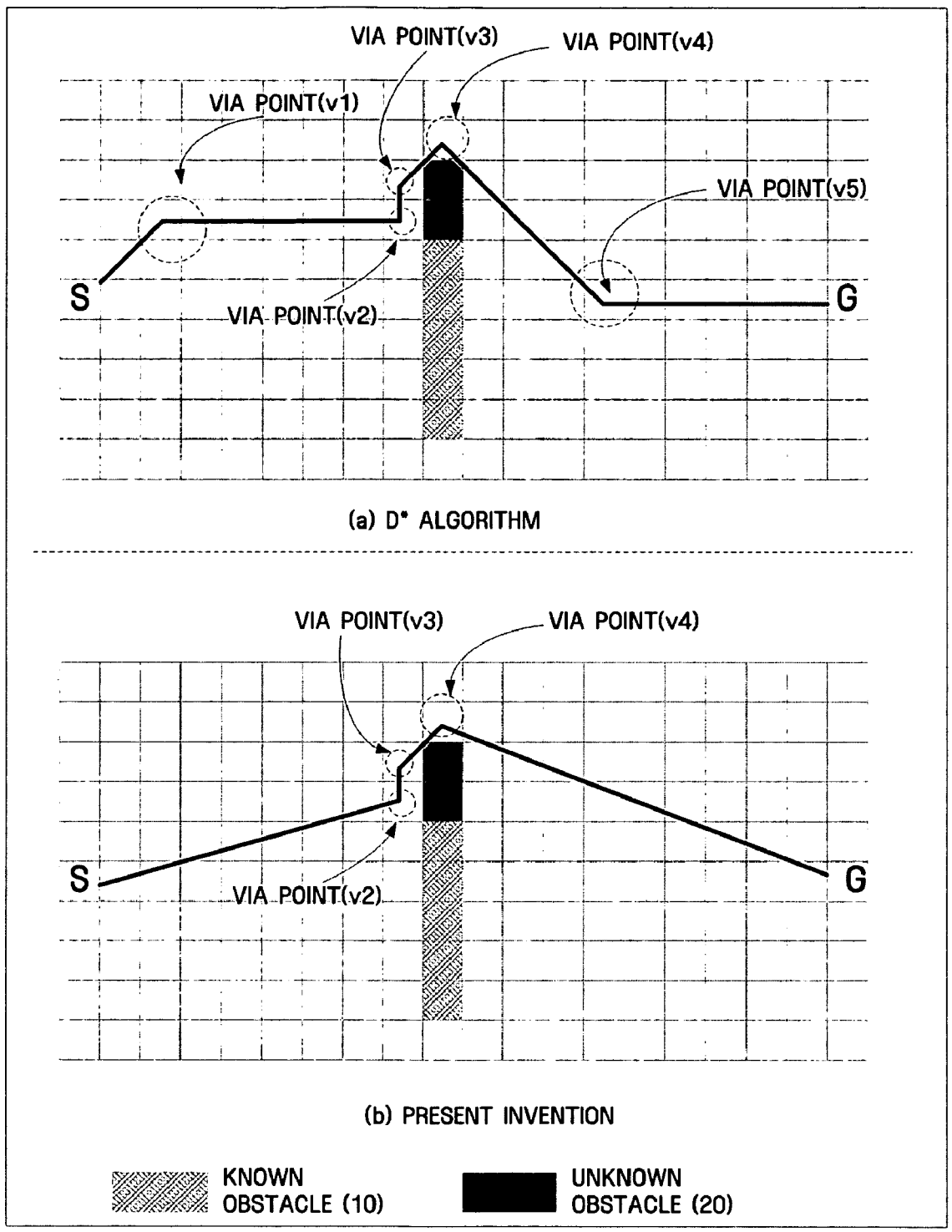
FIG. 13 illustrates another example of comparison between a conventional D* algorithm and an embodiment of the present invention.

FIGS. 12 through 13 illustrate experiments performed to compare a path planned according to the conventional D* algorithm with a path planned according to the present invention.

In the experiments, a mobile home appliance moved at a speed of 15 cm/sec, and included a distance sensor to detect an obstacle. An entire movement space had a size of 6×3 m, and a cell had a size of 30×30 cm. Accordingly, the total number of cells was 20×10=300. Obstacles were largely divided into known obstacles 10 and unknown obstacles 20. Before departing from a start point S, a path was planned based on the known obstacles 10.

FIG. 12 shows an example of comparison between the conventional D* algorithm and an embodiment of the present invention.

When a path is planned according to information regarding the positions of the known obstacles 10, a goal G can be reached by moving straight from the start point S. However, during movement, when collision with the unknown obstacle 20 occurs or the unknown obstacle 20 is sensed by an obstacle sensor, it is determined that straight movement is impossible.

In this case, the path is changed according to the conventional D* algorithm, as illustrated in FIG. 12(a). In other words, FIG. 12(a) illustrates the path replanned to avoid the unknown obstacle 20 in response to the determination that straight movement to the goal G is impossible due to the unknown obstacle 20. Since the D* algorithm moves in units of cells, the goal G is reached through via points v1 and v2. A movement distance from the via point v1 to the goal G through the via point v2 is 280 cm.

FIG. 12(b) illustrates the path replanned to avoid the unknown obstacle 20 in response to the determination that straight movement to the goal G is impossible due to the unknown obstacle 20, according to an embodiment of the present invention. Since a movement in the present invention is not restricted to a cell unit, a straight movement from the via point v1 to the goal G is possible. As a result, a movement distance from the via point 1 to the goal G is 260 cm, which is reduced by about 20 cm from the movement distance illustrated in FIG. 12(a).

FIG. 13 illustrates another example of comparison between the conventional D* algorithm and an embodiment of the present invention.

Initially, the position of the known obstacle 10 is detected, and a path to the goal G is planned avoiding the known obstacle 10. During movement, in response to contact with the unknown obstacle 20 occurring, or the unknown obstacle 20 being sensed by an obstacle sensor, it is determined that straight movement is impossible.

FIG. 13(a) illustrates the path replanned according to the conventional D* algorithm. In other words, FIG. 13(a) illustrates the path replanned to avoid the unknown obstacle 20 in response to the determination that straight movement to the goal G is impossible due to the unknown obstacle 20. Since the D* algorithm moves in units of cells, the goal G is reached through via points v1, v2, v3, v4, and v5. FIG. 13(b) illustrates the path replanned to avoid the unknown obstacle 20 in response to the determination that straight movement to the goal G is impossible due to the unknown obstacle 20 according to according to an embodiment of the present invention. Since a movement in the present invention is not restricted to a cell unit, the via points v1 and v5 illustrated in FIG. 13(a) are unnecessary, and thus are erased according to the present invention. Accordingly, the goal G can be reached through the via points v2, v3, and v4.

When the path illustrated in FIG. 13(b) is compared with that illustrated in FIG. 13(a), it can be seen that a movement distance moved in FIG. 13(b) is shorter.

FIG. 14 is a table comparing movement time between the conventional D* algorithm and embodiments of the present invention illustrated in FIGS. 12 and 13.

According to the table illustrated in FIG. 14, the present invention reduces the movement time by about 30 seconds as compared to the conventional D* algorithm in the experiments illustrated in (a) and (b) of FIG. 12.

The present invention reduces the movement time by about 10 seconds as compared to the conventional D* algorithm in the experiments illustrated in (a) and (b) in FIG. 13. In these experiments, since the number of cells was not changed, the present invention can realize movement in a minimum cost path without drawbacks, such as an increase in calculation time and lack of memory, that may be caused by an increase in the number of cells. According to the present invention, movement using a grid map can be performed in a minimum cost path avoiding obstacles. In addition, the minimum cost path can be planned without being limited to the positions of neighbor cells on the grid map.

In addition to the above-described embodiments, the method of the present invention can also be implemented by executing computer readable code/instructions in/on a medium, e.g., a computer readable medium. The medium can correspond to any medium/media permitting the storing and/or transmission of the computer readable code. The code/instructions may form a computer program.

The computer readable code/instructions can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. The medium may also be a distributed network, so that the computer readable code/instructions is stored/transferred and executed in a distributed fashion. The computer readable code/instructions may be executed by one or more processors.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of moving a mobile appliance in a shortest path using a grid map, the method comprising: calculating a move cost to a goal, from each of a plurality of cells comprised in a space in which the mobile home appliance moves, and planning a neighbor-cell based movement direction to the goal according to the minimum move cost while maintaining a size of each of the plurality of cells; determining one or more via points at which a direction changes on the neighbor-cell based movement direction; planning the shortest path from an apart-cell based movement direction by selecting one or more shortest-distance via points from the via points; and moving the mobile home appliance according to the apart-cell based movement direction, wherein the neighbor-cell based movement direction is calculated from a central cell and a neighbor cell, wherein the apart-cell based movement direction is calculated from the central cell and an apart cell, wherein the shortest path determining initial via points is planned using the neighbor-cell based movement direction, and then the shortest path is planned using both the neighbor-cell based movement direction and the apart-cell based movement direction, wherein the planning of the shortest path comprises:

determining whether a straight movement is possible between a first via point and a second via point which do not neighbor each other; and erasing a via point existing between the first via point and the second via point in response to determining that the straight movement therebetween is possible, and wherein the method is performed using at least one processor.

2. The method of claim 1, further comprising receiving information regarding the space in which the mobile home appliance moves.

3. The method of claim 1, wherein the move cost is calculated as a shortest distance from each cell to the goal according to cell to cell movement.

4. A method of moving a mobile home appliance in a shortest path using a grid map, the method comprising: determining one or more via points at which a direction changes on a neighbor-cell based movement direction; planning the shortest path from an apart-cell based movement direction by selecting one or more shortest-distance via points from the via points while maintaining a size of each of a plurality of cells comprised in a space in which the neighbor-cell based movement direction is located; and moving the mobile home appliance according to the apart-cell based movement,
wherein the neighbor-cell based movement direction is calculated from a central cell and a neighbor cell,
wherein the apart-cell based movement direction is calculated from the central cell and an apart cell,
wherein the shortest path determining initial via points is planned using the neighbor-cell based movement direction, and then the shortest path is planned using both the neighbor-cell based movement direction and the apart-cell based movement direction,
wherein the planning of the shortest path comprises:
determining whether a straight movement is possible between a first via point and a second via point which do not neighbor each other; and
erasing a via point existing between the first via point and the second via point in response to determining that the straight movement therebetween is possible, and
wherein the method is performed using at least one processor.

5. The method of claim 4, wherein at least one of the via points exists in an intermediate position between a first and second shortest-distance via points on the apart-cell based movement direction.

6. The method of claim 4, wherein the neighbor-cell based movement direction exists between a goal and each of a plurality of cells comprised in a space in which a mobile home appliance moves.

7. The method of claim 6, wherein the neighbor-cell based movement direction is planned according to a minimum move cost calculated from each of the cells to the goal.

8. A method of moving a mobile home appliance in a shortest path using a grid map having a plurality of cells, the method comprising: determining via points at which a direction changes on a neighbor-cell based movement direction while maintaining a size of each of a plurality of cells of the grid map on which the neighbor-cell based movement direction is located; moving the mobile home appliance from a first via point to a second via point among the via points, wherein at least one of the via points exists at an intermediate point on the movement direction between the first and second via points; determining whether a straight movement is possible between a first via point and a second via point which do not neighbor each other; and erasing a via point existing between the first via point and the second via point in response to determining that the straight movement therebetween is possible,
wherein the neighbor-cell based movement direction is calculated from a central cell and a neighbor cell,
wherein the apart-cell based movement direction is calculated from the central cell and an apart cell,
wherein the shortest path determining initial via points is planned using the neighbor-cell based movement direction, and then the shortest path is planned using both the neighbor-cell based movement direction and the apart-cell based movement direction, and
wherein the method is performed using at least one processor.

9. The method of claim 8, wherein the neighbor-cell based movement direction exists between a goal and each of the plurality of cells comprised in a space in which the mobile home appliance moves.

10. The method of claim 9, wherein the neighbor-cell based movement direction is planned according to a minimum move cost calculated from each of the cells to the goal.

11. The method of claim 9, wherein the neighbor-cell based movement direction is predetermined.

12. The method of claim 9, further comprising calculating the neighbor-cell based movement direction before the determining of the via points.

13. A method of planning a shortest path on which a mobile home appliance moves using a grid map, the method comprising: determining one or more via points at which a direction changes on a neighbor-cell based movement direction; and planning the shortest path from an apart-cell based movement direction by selecting one or more shortest-distance via points from the via points while maintaining a size of each of a plurality of cells of the grid map on which the movement direction is located,
wherein the shortest path extends from a first shortest-distance via point to a second shortest-distance via point,
wherein the neighbor-cell based movement direction is calculated from a central cell and a neighbor cell,
wherein the apart-cell based movement direction is calculated from the central cell and an apart cell,
wherein the shortest path determining initial via points is planned using the neighbor-cell based movement direction, and then the shortest path is planned using both the neighbor-cell based movement direction and the apart-cell based movement direction,
wherein the planning of the shortest path comprises:
determining whether a straight movement is possible between a first via point and a second via point which do not neighbor each other; and
erasing a via point existing between the first via point and the second via point in response to determining that the straight movement therebetween is possible, and
wherein the method is performed using at least one processor.

14. The method of claim 13, wherein at least one of the via points exists in an intermediate position between the first and second shortest-distance via points on the movement path.

15. A method of planning a shortest path on which a mobile home appliance moves using a grid map having a plurality of cells, the method comprising: determining via points at which a direction changes on a neighbor-cell based movement direction; and planning at least a portion of the shortest path from a first via point to a second via point among the via points while maintaining a size of each of a plurality of cells of the grid map on which the movement direction is located,
wherein at least one of the via points exists at an intermediate point in the movement direction between the first and second via points,
wherein the neighbor-cell based movement direction is calculated from a central cell and a neighbor cell, wherein the apart-cell based movement direction is calculated from the central cell and an apart cell, wherein the shortest path determining initial via points is planned using the neighbor-cell based movement direction, and then the shortest path is planned using both the neighbor-cell based movement direction and the apart-cell based movement direction, wherein the planning of at least a portion of the shortest path comprises:

determining whether a straight movement is possible between a first via point and a second via point which do not neighbor each other; and erasing a via point existing between the first via point and the second via point in response to determining that the straight movement therebetween is possible, and wherein the method is performed using at least one processor.

* * * * *